(12) United States Patent
Hokoi et al.

(10) Patent No.: US 10,086,821 B2
(45) Date of Patent: Oct. 2, 2018

(54) HYBRID VEHICLE

(71) Applicant: Toyota Jidosha Kabushiki Kaisha, Toyota-shi, Aichi-ken (JP)

(72) Inventors: Koji Hokoi, Toyota (JP); Koji Yamamoto, Okazaki (JP); Koji Yoshihara, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 74 days.

(21) Appl. No.: 15/362,081

(22) Filed: Nov. 28, 2016

(65) Prior Publication Data

US 2017/0151939 A1    Jun. 1, 2017

(30) Foreign Application Priority Data

Nov. 30, 2015   (JP) .................................. 2015-233892

(51) Int. Cl.
*B60K 6/26*        (2007.10)
*B60W 20/10*      (2016.01)
(Continued)

(52) U.S. Cl.
CPC ............. *B60W 20/10* (2013.01); *B60K 6/365* (2013.01); *B60K 6/445* (2013.01); *B60K 6/54* (2013.01); *B60L 11/14* (2013.01); *B60W 10/06* (2013.01); *B60W 10/08* (2013.01); *B60W 20/11* (2016.01); *B60W 20/20* (2013.01); *B60W 20/40* (2013.01); *B60L 2240/423* (2013.01); *B60L 2250/26* (2013.01); *B60L 2260/20* (2013.01); *B60W 2050/0089* (2013.01); *B60W 2510/083* (2013.01); *B60W 2540/10* (2013.01); *B60W 2710/06* (2013.01); *B60W 2710/083* (2013.01); *B60Y 2300/182* (2013.01); *B60Y 2300/43* (2013.01); *B60Y 2300/60* (2013.01);
(Continued)

(58) Field of Classification Search
CPC .. B60K 6/365; B60K 6/445; B60K 2006/262; B60K 6/26; Y10S 903/906; B60L 11/14; B60L 2240/423; B60L 2260/20; B60L 2260/26; B60Y 2200/92; B60Y 2300/43; B60Y 2300/60; B60W 10/08; B60W 20/10; B60W 20/40; B60W 20/19; B60W 20/20; B60W 2510/083; B60W 2710/06; B60W 2710/083
USPC .............. 701/22; 180/65.265, 65.28, 65.285; 475/5, 151
See application file for complete search history.

(56) References Cited

U.S. PATENT DOCUMENTS 6,553,287 B1    4/2003   Supina et al.
8,508,067 B2 *  8/2013   Song ..................... B60W 20/50
                                                                        307/10.1
(Continued)

FOREIGN PATENT DOCUMENTS

JP    2003-201880 A    7/2003
JP    2008-168700 A    7/2008

*Primary Examiner* — Dalena Tran
(74) *Attorney, Agent, or Firm* — Dinsmore & Shohl LLP

(57) ABSTRACT

When there is a history that a required torque has reached a high torque range and the required torque falls within a low torque range, a start threshold is changed from a value larger than a maximum double-drive torque to a value smaller than a selection threshold for selecting a single-drive mode or a double-drive mode. When the required torque becomes larger than the start threshold, an engine is started.

4 Claims, 13 Drawing Sheets

(51) Int. Cl.
*B60L 11/14* (2006.01)
*B60W 20/40* (2016.01)
*B60K 6/365* (2007.10)
*B60K 6/445* (2007.10)
*B60K 6/54* (2007.10)
*B60W 10/06* (2006.01)
*B60W 10/08* (2006.01)
*B60W 20/20* (2016.01)
*B60W 20/11* (2016.01)
*B60W 50/00* (2006.01)

(52) U.S. Cl.
CPC ...... *B60Y 2400/112* (2013.01); *Y02T 10/6239* (2013.01); *Y02T 10/6286* (2013.01); *Y10S 903/906* (2013.01)

(56) References Cited

U.S. PATENT DOCUMENTS 9,248,825 B2 * 2/2016 King ............... B60L 11/123
9,800,182 B2 * 10/2017 Zhou ............... H02P 4/00

* cited by examiner

HYBRID VEHICLE

CROSS-REFERENCE TO RELATED APPLICATIONS

This application claims priority to Japanese Patent Application No. 2015-233892 filed on Nov. 30, 2015, which is incorporated herein by reference in its entirety including the specification, drawings and abstract.

BACKGROUND

1. Technical Field

The present disclosure relates to a hybrid vehicle.

2. Description of Related Art

Conventionally, there is suggested a hybrid vehicle (see, for example, Japanese Patent Application Publication No. 2003-201880 (JP 2003-201880 A)). This hybrid vehicle includes a generator-motor connected to a sun gear of a planetary gear, an engine connected to a carrier, a drive shaft connected to a ring gear, a propelling motor connected to the drive shaft, and a one-way clutch that prohibits reverse rotation (negative rotation) of the engine. In this hybrid vehicle, during a stop of the engine, when maximum acceleration is being required and when an estimated total torque of the propelling motor and the generator-motor is smaller than a maximum total torque of the propelling motor and the engine, the engine is started.

The hybrid vehicle having the above-described hardware configuration is able to select a so-called double-drive mode in which the hybrid vehicle travels by using torque from the propelling motor and torque from the generator-motor (torque in a direction to rotate the generator-motor in the negative direction) while the engine is placed in a rotation stopped state. At the time of starting the engine, the engine is cranked by using torque from the generator-motor (torque in a direction to rotate the generator-motor in the positive direction). Thus, the engine is started. Therefore, at the time of starting the engine in the double-drive mode, the direction of torque from the generator-motor reverses, so the direction of torque that is output from the generator-motor to act on the drive shaft reverses, with the result that there is a possibility that the total torque that is output to the drive shaft reduces by a large amount to some extent. At the time of starting the engine because of the fact that a required torque becomes larger than a start threshold, it is presumable that a driver is increasing an accelerator operation amount (issuing an acceleration request). For this reason, if the above-described phenomenon occurs, the driver may experience a feeling of slowness. For this reason, when it is assumed that the required torque becomes relatively large after the present time, it is desirable to take measures in advance in order not to cause the driver to experience a feeling of slowness at the time of starting the engine.

SUMMARY

The present disclosure provides a hybrid vehicle that, when it is assumed that a required torque becomes relatively large after the present time, takes measures in advance in order not to cause a driver to experience a feeling of slowness at the time of starting an engine.

An aspect of the present disclosure provides a hybrid vehicle. The hybrid vehicle includes an engine, a first motor, a planetary gear set, a second motor, a rotation restriction mechanism, a battery and an electronic control unit. The planetary gear set includes at least one planetary gear. The engine, the first motor and a drive shaft are connected to at least part of rotating elements of the at least one planetary gear such that the first motor, the engine and the drive shaft are arranged in this order in a nomograph. The drive shaft is coupled to an axle. The second motor is mechanically coupled to the drive shaft. The rotation restriction mechanism is configured to restrict rotation of the engine. The battery is configured to exchange electric power with the first motor and the second motor. The electronic control unit is configured to (i) control the engine, the first motor and the second motor in any one of a plurality of drive modes including a hybrid drive mode and an electric drive mode, so as to travel the hybrid vehicle by using a required torque that is required for the drive shaft in response to an accelerator operation amount, the hybrid drive mode being a mode in which the hybrid vehicle travels while the engine is placed in a rotating state to cause the engine to operate, and the electric drive mode being a mode in which the hybrid vehicle travels by using torque from at least the second motor while the engine is placed in a rotation stopped state to cause the engine not to operate, (ii) select a single-drive mode in the electric drive mode when the required torque is smaller than or equal to a selection threshold smaller than or equal to a first maximum torque that is outputtable to the drive shaft in single-drive mode, and select a double-drive mode in the electric drive mode when the required torque is larger than the selection threshold, the single-drive mode being a mode in which the hybrid vehicle travels by using torque from only the second motor, and the double-drive mode being a mode in which the hybrid vehicle travels by using torque from the first motor and the second motor, (iii) control the hybrid vehicle so as to crank the engine to be started by using torque from the first motor when the required torque becomes larger than a start threshold in the electric drive mode, and (iv) change the start threshold from a third value larger than the selection threshold to a fourth value smaller than or equal to the selection threshold and larger than or equal to a second value, in the electric drive mode when a first predetermined condition that there is a history that the required torque has become larger than a first value smaller than or equal to the selection threshold and the required torque at a present time is smaller than or equal to the second value smaller than or equal to the first value is satisfied.

With the above-described hybrid vehicle according to the present disclosure, in the electric drive mode, when the required torque that is required from the drive shaft in response to the accelerator operation amount is smaller than or equal to the selection threshold smaller than or equal to the first maximum torque that is outputtable to the drive shaft in the single-drive mode, the single-drive mode is selected from between the single-drive mode in which the hybrid vehicle travels by using torque from only the second motor and the double-drive mode in which the hybrid vehicle travels by using torque (negative torque) from the first motor and torque from the second motor, and, when the required torque is larger than the selection threshold, the double-drive mode is selected. When the required torque becomes larger than the start threshold in the electric drive mode (the single-drive mode or the double-drive mode), the hybrid vehicle is controlled such that the engine is cranked to be started by using torque (positive torque) from the first motor. In the electric drive mode, when the first predetermined condition that there is a history that the required torque has become larger than the first value smaller than or equal to the selection threshold and the current required torque is smaller than or equal to the second value smaller than or equal to the first value is satisfied, the start threshold is changed from the third value larger than the selection threshold to the fourth value smaller than or equal to the selection threshold and larger than or equal to the second value. When the first predetermined condition is satisfied, this is the case where the required torque has become relatively large (a driver has exhibited an intention to accelerate) before the present time, so it is assumed that the required torque can become relatively large (the driver can exhibit an intention to accelerate) again after the present time. In the electric drive mode, when the first predetermined condition is satisfied, the current required torque is smaller than or equal to the second value, and the single-drive mode is selected. Therefore, by changing the start threshold from the third value to the fourth value, the engine is started in the single-drive mode at the time when the required torque becomes larger than the start threshold (fourth value) thereafter. Thus, in comparison with the case where the engine is started in the double-drive mode, it is possible to reduce a reduction in the total torque that is output to the drive shaft at the time when the engine is started, so it is possible to reduce a feeling of slowness that is experienced by the driver. As a result of these, when it is assumed that the required torque can become relatively large again after the present time, it is possible to take measures in advance in order not to cause the driver to experience a feeling of slowness at the time of starting the engine. Until the condition is satisfied, by setting the start threshold to the third value larger than the selection threshold, it is possible to reduce the start of the engine.

The planetary gear set may include a planetary gear. The planetary gear includes a sun gear connected to the first motor, a carrier connected to the engine, and a ring gear connected to the drive shaft. The second motor may be directly coupled to the drive shaft. The planetary gear set may include a planetary gear and a reduction gear. The planetary gear includes a sun gear connected to the first motor, a carrier connected to the engine, and a ring gear connected to the drive shaft. The reduction gear is connected to the ring gear. The second motor may be mechanically coupled to the drive shaft by being connected to the ring gear via the reduction gear. The planetary gear set may include a first planetary gear, a second planetary gear, a clutch and a brake. The first planetary gear includes a first sun gear, a first carrier connected to the drive shaft, and a first ring gear connected to the engine. The second planetary gear includes a second sun gear connected to the first motor, a second carrier connected to the drive shaft and the first carrier, and a second ring gear. The clutch connects the first sun gear and the second ring gear to each other, or releases the connection therebetween. The brake fixes the second ring gear such that the second ring gear is non-rotatable, or releases the second ring gear such that the second ring gear is rotatable. The second motor may be mechanically coupled to the drive shaft by being connected to the first sun gear.

The rotation restriction mechanism may be a one-way clutch. The one-way clutch permits rotation of the engine in a positive direction, or restricts (prohibits) rotation of the engine in a negative direction. Alternatively, the rotation restriction mechanism may be a brake. The brake fixes the engine such that the engine is non-rotatable, or releases the engine such that the engine is rotatable.

The first value means a lower limit boundary value of a predetermined high torque range. The second value means an upper limit boundary value of a predetermined low torque range.

In the thus configured hybrid vehicle according to the present disclosure, the third value may be a value larger than a second maximum torque that is outputtable to the drive shaft in the double-drive mode. Thus, it is possible to further reduce the start of the engine.

In the hybrid vehicle, the electronic control unit may be configured to change the start threshold to the third value, when at least one of a vehicle speed condition, a torque condition or a time condition is satisfied. The vehicle speed condition may be a condition that, after the start threshold is changed to the fourth value, a vehicle speed decreases across a predetermined vehicle speed in the electric drive mode. The torque condition may be a condition that a state where the required torque is smaller than or equal to the second value continues for a first predetermined time. The time condition may be a condition that a second predetermined time elapses from when the start threshold is changed to the fourth value. Thus, for example, when it is not assumed that the required torque exceeds the third value in a certain period of time from the present time, it is possible to further reduce the start of the engine.

In the hybrid vehicle, the electronic control unit may be configured to: (i) execute control such that the engine is stopped when the required torque becomes smaller than or equal to a fifth value smaller than or equal to the fourth value in the hybrid drive mode, and (ii) change the start threshold from the third value to the fourth value even when the first predetermined condition is not satisfied when a second predetermined condition that a state where the required torque is larger than the first value continues over a third predetermined time is satisfied. As described above, both the first value and the fourth value are smaller than or equal to the selection threshold. When the second predetermined condition is satisfied, the required torque is larger than the first value. Therefore, as a result of changing the start threshold to the fourth value, there can be the case where the engine is started in the single-drive mode and the case where the engine is started in the double-drive mode. However, when the required torque becomes smaller than or equal to the fifth value in the hybrid drive mode, the engine is stopped, and the electric drive mode is resumed. Therefore, after the electric drive mode is resumed, it is possible to start the engine in the single-drive mode.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of the present disclosure will be described.

Figure 1:
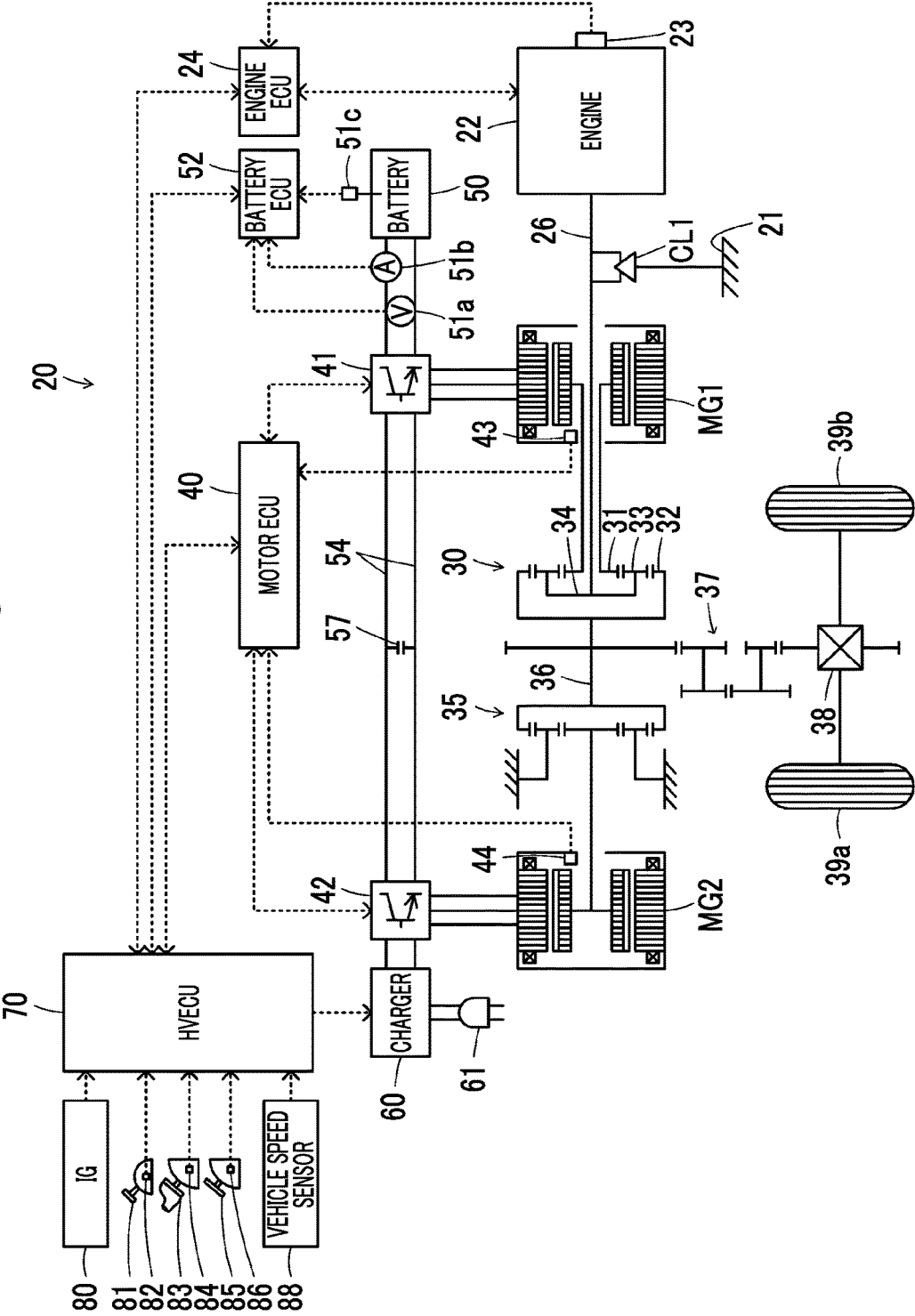
FIG. 1 is a configuration view that schematically shows the configuration of a hybrid vehicle according to a first embodiment as an example of the present disclosure.

FIG. 1 is a configuration view that schematically shows the configuration of a hybrid vehicle 20 according to a first embodiment of the present disclosure. As shown in FIG. 1, the hybrid vehicle 20 according to the first embodiment includes an engine 22, a planetary gear 30 that serves as a planetary gear set, a one-way clutch CL1, motors MG1, MG2, inverters 41, 42, a battery 50, a charger 60 and a hybrid electronic control unit (hereinafter, referred to as HV-ECU) 70.

The engine 22 is configured as an internal combustion engine that outputs power by using gasoline, light oil, or the like, as fuel. The engine 22 undergoes operation control that is executed by an engine electronic control unit (hereinafter, referred to as engine ECU) 24.

Although not shown in the drawing, the engine ECU 24 is a microprocessor that mainly includes a CPU and that further includes a ROM, a RAM, input/output ports and a communication port in addition to the CPU. The ROM stores a processing program. The RAM temporarily stores data.

Signals from various sensors, which are required to execute operation control over the engine 22, are input to the engine ECU 24 via the input port. The signals that are input to the engine ECU 24 include a crank angle θcr and a throttle opening degree TH. The crank angle θcr is input from a crank position sensor 23 that detects a rotation position of a crankshaft 26 of the engine 22. The throttle opening degree TH is input from a throttle valve position sensor that detects a position of a throttle valve.

Various control signals for operation control over the engine 22 are output from the engine ECU 24 via the output port. The signals that are output from the engine ECU 24 include a drive control signal that is output to a throttle motor that adjusts the position of the throttle valve, a drive control signal that is output to a fuel injection valve, and a drive control signal that is output to an ignition coil integrated with an ignitor.

The engine ECU 24 is connected to the HV-ECU 70 via the communication port. The engine ECU 24 executes operation control over the engine 22 in response to a control signal from the HV-ECU 70, and, where necessary, outputs data regarding the operating state of the engine 22 to the HV-ECU 70. The engine ECU 24 computes a rotation speed of the crankshaft 26, that is, a rotation speed Ne of the engine 22, on the basis of the crank angle θcr from the crank position sensor 23.

The planetary gear 30 is a single pinion planetary gear. The planetary gear 30 includes a sun gear 31, a ring gear 32, a plurality of pinions 33 and a carrier 34. The sun gear 31 is an external gear. The ring gear 32 is an internal gear. The plurality of pinions 33 are in mesh with the sun gear 31 and the ring gear 32. The carrier 34 supports the plurality of pinions 33 such that each pinion 33 is rotatable and revolvable. The rotor of the motor MG1 is connected to the sun gear 31. A drive shaft 36 is connected to the ring gear 32. The drive shaft 36 is coupled to drive wheels 39a, 39b via a differential gear 38 and a gear mechanism 37. The crankshaft 26 of the engine 22 is connected to the carrier 34.

The one-way clutch CL1 is connected to the crankshaft 26 of the engine 22 (the carrier 34 of the planetary gear 30) and also connected to a case 21 fixed to a vehicle body. The one-way clutch CL1 permits the engine 22 to rotate in a positive rotation direction with respect to the case 21, and restricts (prohibits) rotation of the engine 22 in a negative rotation direction with respect to the case 21.

The motor MG1 is, for example, a synchronous generator-motor. As described above, the rotor of the motor MG1 is connected to the sun gear 31 of the planetary gear 30. The motor MG2 is, for example, a synchronous generator-motor. The rotor of the motor MG2 is connected to the drive shaft 36 via the reduction gear 35. The inverters 41, 42 are connected to power lines 54 together with the battery 50. A smoothing capacitor 57 is connected to the power lines 54. Each of the motors MG1, MG2 is driven to rotate under switching control over a plurality of switching elements (not shown) of a corresponding one of the inverters 41, 42, which is executed by a motor electronic control unit (hereinafter, referred to as motor ECU) 40.

Although not shown in the drawing, the motor ECU 40 is a microprocessor that mainly includes a CPU and that further includes a ROM, a RAM, input/output ports and a communication port in addition to the CPU. The ROM stores a processing program. The RAM temporarily stores data.

Signals from various sensors, which are required to execute drive control over the motors MG1, MG2, are input to the motor ECU 40 via the input port. The signals that are input to the motor ECU 40 include rotation positions θm1, θm2, and phase currents. The rotation position θm1 is input from a rotation position detection sensor 43 that detects the rotation position of the rotor of the motor MG1. The rotation position θm2 is input from a rotation position detection sensor 44 that detects the rotation position of the rotor of the motor MG2. The phase currents are input from current sensors that respectively detect currents respectively flowing through the phases of each of the motors MG1, MG2.

Switching control signals, and the like, are output from the motor ECU 40 to switching elements (not shown) of the inverters 41, 42.

The motor ECU 40 is connected to the HV-ECU 70 via the communication port. The motor ECU 40 executes drive control over the motors MG1, MG2 in response to a control signal from the HV-ECU 70, and, where necessary, outputs data regarding the driving states of the motors MG1, MG2 to the HV-ECU 70. The motor ECU 40 computes the rotation speed Nm1 of the motor MG1 on the basis of the rotation position θm1 of the rotor of the motor MG1 from the rotation position detection sensor 43, and computes the rotation speed Nm2 of the motor MG2 on the basis of the rotation position ƒm2 of the rotor of the motor MG2 from the rotation position detection sensor 44.

The battery 50 is, for example, a lithium ion secondary battery or a nickel-metal hydride secondary battery, and is connected to the power lines 54 together with the inverters 41, 42 as described above. The battery 50 is managed by a battery electronic control unit (hereinafter, referred to as battery ECU) 52.

Although not shown in the drawing, the battery ECU 52 is a microprocessor that mainly includes a CPU and that further includes a ROM, a RAM, input/output ports and a communication port in addition to the CPU. The ROM stores a processing program. The RAM temporarily stores data.

Signals from various sensors, which are required to manage the battery 50, are input to the battery ECU 52 via the input port. The signals that are input to the battery ECU 52 include a battery voltage Vb, a battery current Ib (the battery current Ib is a positive value when the battery 50 is discharged), and a battery temperature Tb. The battery voltage Vb is output from a voltage sensor 51a installed between the terminals of the battery 50. The battery current Ib is output from a current sensor 51b connected to the output terminal of the battery 50. The battery temperature Tb is output from a temperature sensor 51c connected to the battery 50.

The battery ECU 52 is connected to the HV-ECU 70 via the communication port, and, where necessary, outputs data regarding the state of the battery 50 to the HV-ECU 70. The battery ECU 52 computes a state of charge SOC on the basis of an accumulated value of the battery current Ib from the current sensor 51b. The state of charge SOC is the percentage of the capacity of dischargeable electric power from the battery 50 to the total capacity of the battery 50. The battery ECU 52 computes input and output limits Win, Wout on the basis of the computed state of charge SOC and the battery temperature Tb from the temperature sensor 51c. The input limit Win is an allowable charging power at or below which the battery 50 is allowed to be charged. The output limit Wout is an allowable discharging power at or below which the battery 50 is allowed to be discharged.

The charger 60 is connected to the power lines 54, and includes an AC/DC converter and a DC/DC converter. The AC/DC converter converts alternating-current power, supplied from the external power supply via the power supply plug 61, to direct-current power. The DC/DC converter converts the voltage of direct-current power from the AC/DC converter and supplies the direct-current power toward the battery 50. When the power supply plug 61 is connected to the external power supply, such as a domestic power supply, the charger 60 supplies electric power from the external power supply to the battery 50 under control of the HV-ECU 70 over the AC/DC converter and the DC/DC converter.

Although not shown in the drawing, the HV-ECU 70 is a microprocessor that mainly includes a CPU and that further includes a ROM, a RAM, input/output ports and a communication port in addition to the CPU. The ROM stores a processing program. The RAM temporarily stores data.

Signals from various sensors are input to the HV-ECU 70 via the input port. The signals that are input to the HV-ECU 70 include an ignition signal, a shift position SP, an accelerator operation amount Acc, a brake pedal position BP and a vehicle speed V. The ignition signal is output from an ignition switch 80. The shift position SP is output from a shift position sensor 82 that detects the operating position of a shift lever 81. The accelerator operation amount Acc is output from an accelerator pedal position sensor 84 that detects the depression amount of an accelerator pedal 83. The brake pedal position BP is output from a brake pedal position sensor 86 that detects the depression amount of a brake pedal 85. The vehicle speed V is output from a vehicle speed sensor 88.

A control signal to the charger 60, or the like, is output from the HV-ECU 70 via the output port.

As described above, the HV-ECU 70 is connected to the engine ECU 24, the motor ECU 40 and the battery ECU 52 via the communication port, and exchanges various control signals and data with the engine ECU 24, the motor ECU 40 and the battery ECU 52.

The thus configured hybrid vehicle 20 according to the first embodiment controls the engine 22 and the motors MG1, MG2 so as to travel by using a required torque Tp* of the drive shaft 36 based on the accelerator operation amount Acc and the vehicle speed V in any one of a plurality of drive modes, including a hybrid drive (HV drive) mode and an electric drive (EV drive) mode, in charge depleting (CD) mode or charge sustaining (CS) mode.

The CD mode is a mode in which the EV drive mode is given a higher priority between the HV drive mode and the EV drive mode as compared to the CS mode. In the first embodiment, when the state of charge SOC of the battery 50 is higher than a threshold Shv1 (for example, 45%, 50%, 55%, or the like) at a startup of the system, the hybrid vehicle 20 travels in the CD mode until the state of charge SOC of the battery 50 becomes lower than or equal to a threshold Shv2 (for example, 25%, 30%, 35%, or the like), and travels in the CS mode after the state of charge SOC of the battery 50 becomes lower than or equal to the threshold Shv2 until a stop of the system. When the state of charge SOC of the battery 50 is lower than or equal to the threshold Shv1 at a startup of the system, the hybrid vehicle 20 travels in the CS mode until a stop of the system. When the power supply plug 61 is connected to an external power supply during a stop of the system at a charging point, such as home, the charger 60 is controlled so as to charge the battery 50 with electric power from the external power supply.

The HV drive mode is a mode in which the hybrid vehicle 20 travels while the carrier 34 (engine 22) of the planetary gear 30 is placed in a rotating state to cause the engine 22 to operate. The EV drive mode is a mode in which the hybrid vehicle 20 travels by using torque from at least the motor MG2 while the carrier 34 (engine 22) of the planetary gear 30 is placed in a rotation stopped state to cause the engine 22 not to operate. The EV drive mode includes a single-drive mode and a double-drive mode. In the single-drive mode, the hybrid vehicle 20 travels by using torque from only the motor MG2. In the double-drive mode, the hybrid vehicle 20 travels by using torque from the motor MG1 and the motor MG2.

In the HV drive mode or the EV drive mode (the single-drive mode or the double-drive mode), the engine 22 and the motors MG1, MG2 are controlled under coordinated control of the HV-ECU 70, the engine ECU 24 and the motor ECU 40. Hereinafter, the operation in the EV drive mode (the single-drive mode, the double-drive mode) and the operation in the HV drive mode will be described in this order.

Figure 2:
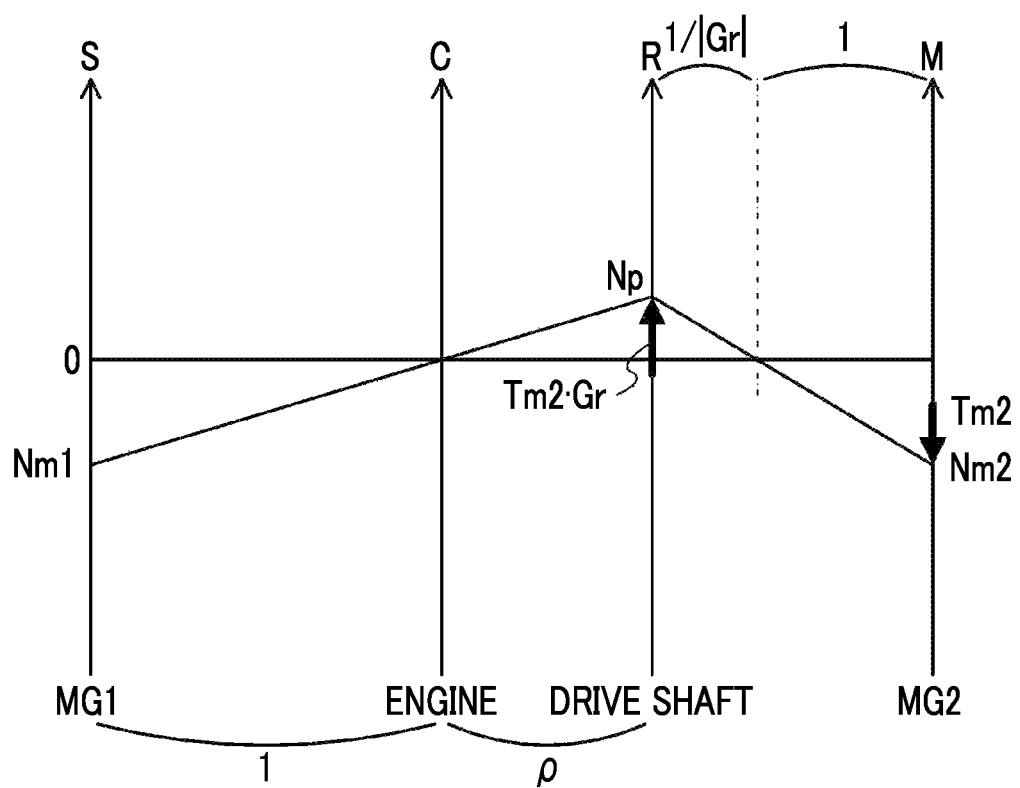
FIG. 2 is a view that illustrates an example of a nomograph of a planetary gear in single-drive mode in the first embodiment.
Figure 3:
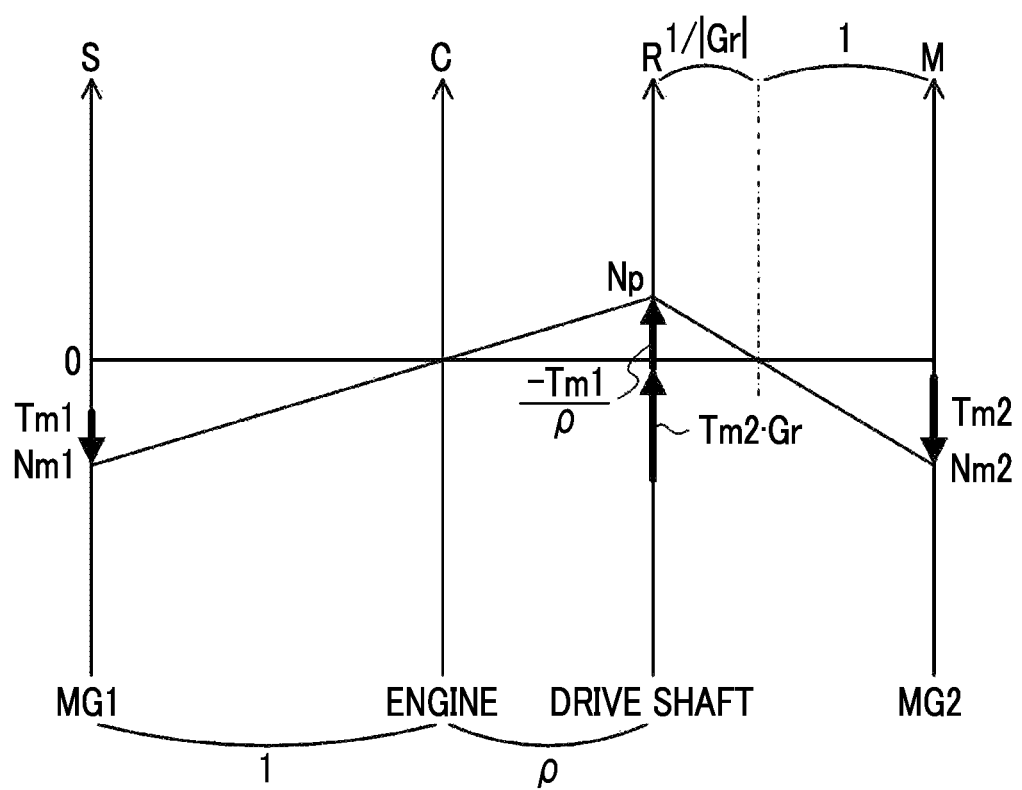
FIG. 3 is a view that illustrates an example of a nomograph of the planetary gear in double-drive mode in the first embodiment.

FIG. 2 is a view that illustrates an example of a nomograph of the planetary gear 30 in the single-drive mode. FIG. 3 is a view that illustrates an example of a nomograph of the planetary gear 30 in the double-drive mode. In FIG. 2 and FIG. 3, the S-axis represents the rotation speed of the sun gear 31 and the rotation speed Nm1 of the motor MG1, the C-axis represents the rotation speed of the carrier 34 and the rotation speed Ne of the engine 22, the R-axis represents the rotation speed of the ring gear 32 and the rotation speed Np of the drive shaft 36, and the M-axis represents the rotation speed of the gear before the speed of the reduction gear 35 is reduced and the rotation speed Nm2 of the motor MG2. $\rho$ denotes the gear ratio (Number of teeth of the sun gear 31/Number of teeth of the ring gear 32) of the planetary gear 30. Gr denotes the reduction gear ratio of the reduction gear 35. In FIG. 2, the wide-line arrow on the M-axis indicates a torque Tm2 that is output from the motor MG2, and the wide-line arrow on the R-axis indicates a torque (Tm2×Gr) that acts on the drive shaft 36 at the time when the torque Tm2 is output from the motor MG2. In FIG. 3, the wide-line arrow on the S-axis indicates a torque Tm1 that is output from the motor MG1, the wide-line arrow on the M-axis indicates a torque Tm2 that is output from the motor MG2, and the two wide-line arrows on the R-axis collectively indicate a torque ($-Tm1/\rho+Tm2\times Gr$) that acts on the drive shaft 36 at the time when the torque Tm1 is output from the motor MG1 and the torque Tm2 is output from the motor MG2.

Hereinafter, in the nomograph, the rotation speed is positive when the rotation speed is higher than zero in FIG. 2 or FIG. 3 and is negative when the rotation speed is lower than zero in FIG. 2 or FIG. 3, and the torque is positive when the torque is directed upward in FIG. 2 or FIG. 3 and is negative when the torque is directed downward in FIG. 2 or FIG. 3. In this case, since the sign of the rotation speed Nm2 of the motor MG2 and the sign of the rotation speed Np of the drive shaft 36 differ from each other, the reduction gear ratio Gr of the reduction gear 35 is a negative value.

In the single-drive mode, the HV-ECU 70 initially sets the required torque Tp* that is required to propel the hybrid vehicle 20 on the basis of the accelerator operation amount Acc and the vehicle speed V. Subsequently, a torque command Tm1* of the motor MG1 is set to zero, and a torque command Tm2* of the motor MG2 is set such that the required torque Tp* is output to the drive shaft 36 within the range of the input and output limits Win, Wout of the battery 50 and a negative-side (downward side in FIG. 2) rated torque Tm2rt1 of the motor MG2. The negative-side rated torque Tm2rt1 of the motor MG2 reduces in absolute value as the absolute value of the rotation speed Nm2 of the motor MG2 increases. The torque commands Tm1*, Tm2* of the motors MG1, MG2 are transmitted to the motor ECU 40. The motor ECU 40 executes switching control over a plurality of switching elements of the inverters 41, 42 such that the motor MG1 is driven at the torque command Tm1* and the motor MG2 is driven at the torque command Tm2*.

Thus, as shown in FIG. 2, the hybrid vehicle 20 is able to travel by outputting the negative torque Tm2 from the motor MG2 to cause the positive torque (Tm2×Gr) to act on the drive shaft 36. A maximum single-drive torque Tpmax1 that is outputtable to the drive shaft 36 in the single-drive mode is equal to a value (Tm2rt1×Gr) obtained by multiplying the negative-side rated torque Tm2rt1 of the motor MG2 by the reduction gear ratio Gr of the reduction gear 35. This is easily derived from the nomograph of FIG. 2. The maximum single-drive torque Tpmax1 reduces as the rotation speed Np of the drive shaft 36 increases.

In the double-drive mode, the HV-ECU 70 initially sets the required torque Tp* that is required to propel the hybrid vehicle 20 on the basis of the accelerator operation amount Acc and the vehicle speed V. Subsequently, the torque commands Tm1*, Tm2* of the motors MG1, MG2 are set such that the required torque Tp* is output to the drive shaft 36 within the range of the input and output limits Win, Wout of the battery 50, a negative-side (downward side in FIG. 3) rated torque Tm1rt1 of the motor MG1 and the negative-side (downward side in FIG. 3) rated torque Tm2rt1 of the motor MG2. The negative-side rated torque Tm1rt1 of the motor MG1 reduces in absolute value as the absolute value of the rotation speed Nm1 of the motor MG1 increases. The torque commands Tm1*, Tm2* of the motors MG1, MG2 are transmitted to the motor ECU 40. The motor ECU 40 executes switching control over the plurality of switching elements of the inverters 41, 42 as described above.

Thus, as shown in FIG. 3, the hybrid vehicle 20 is able to travel by outputting the negative torque Tm1 from the motor MG1 and the negative torque Tm2 from the motor MG2 to cause the positive torque ($-Tm1/\rho+Tm2\times Gr$) to act on the drive shaft 36. A maximum double-drive torque Tpmax2 that is outputtable to the drive shaft 36 in the double-drive mode is equal to the sum ($-Tm1rt1/\rho+Tm2rt1\times Gr$) of a value obtained by multiplying the negative-side rated torque Tm1rt1 of the motor MG1 by the inverse number of the gear ratio $\rho$ of the planetary gear 30 and ($-1$) and a value obtained by multiplying the negative-side rated torque Tm2rt1 of the motor MG2 by the reduction gear ratio Gr of the reduction gear 35. This is easily derived from the nomograph of FIG. 3. The maximum double-drive torque Tpmax2 reduces as the rotation speed Np of the drive shaft 36 increases.

In the first embodiment, in the EV drive mode, the single-drive mode is selected from between the single-drive mode and the double-drive mode when the required torque Tp* is smaller than or equal to a selection threshold Tpref smaller than the maximum single-drive torque Tpmax1, and the double-drive mode is selected from between the single-drive mode and the double-drive mode when the required torque Tp* is larger than the selection threshold Tpref. The selection threshold Tpref reduces as the rotation speed Np of the drive shaft 36 increases.

In the first embodiment, in the double-drive mode, the distribution ratio of torque that is output from the motor MG1 to act on the drive shaft 36 and torque that is output from the motor MG2 to act on the drive shaft 36 within the total torque that is output to the drive shaft 36 is adjusted such that torque from the motor MG2 becomes close to a value (Tpref/Gr), obtained by dividing the selection threshold Tpref for selecting the single-drive mode or the double-drive mode by the reduction gear ratio Gr of the reduction gear 35, or the negative-side rated torque Tm2rt1.

In the HV drive mode, the HV-ECU 70 initially sets the required torque Tp* that is required to propel the hybrid vehicle 20 on the basis of the accelerator operation amount Acc and the vehicle speed V, and calculates a required power Pp* that is required to propel the hybrid vehicle 20 by multiplying the set required torque Tp* by the rotation speed Np of the drive shaft 36. The rotation speed Np of the drive shaft 36 may be, for example, a rotation speed obtained by dividing the rotation speed Nm2 of the motor MG2 by the reduction gear ratio Gr of the reduction gear 35, a rotation speed obtained by multiplying the vehicle speed V by a conversion coefficient, or the like. Subsequently, the required power Pe* that is required from the vehicle is calculated by subtracting a required charging and discharging power Pb* (the required charging and discharging power Pb* is a positive value when the battery 50 is discharged) of the battery 50 from the required power Pp*. A target rotation speed Ne* and target torque Te* of the engine 22 and the torque commands Tm1*, Tm2* of the motors MG1, MG2 are set such that the required power Pe* is output from the engine 22 and the required torque Tp* is output to the drive shaft 36 within the range of the input and output limits Win, Wout of the battery 50, the negative-side rated torque Tm1rt1 of the motor MG1 and the negative-side rated torque Tm2rt1 of the motor MG2. The target rotation speed Ne* and target torque Te* of the engine 22 are transmitted to the engine ECU 24, and the torque commands Tm1*, Tm2* of the motors MG1, MG2 are transmitted to the motor ECU 40. As the engine ECU 24 receives the target rotation speed Ne* and the target torque Te* from the NV-ECU 70, the engine ECU 24 executes intake air amount control, fuel injection control, ignition control, and the like, over the engine 22 such that the engine 22 is operated on the basis of the target rotation speed Ne* and the target torque Te*. As the motor ECU 40 receives the torque commands Tm1*, Tm2* from the HV-ECU 70, the motor ECU 40 executes switching control over the plurality of switching elements of the inverters 41, 42 as described above.

Figure 4:
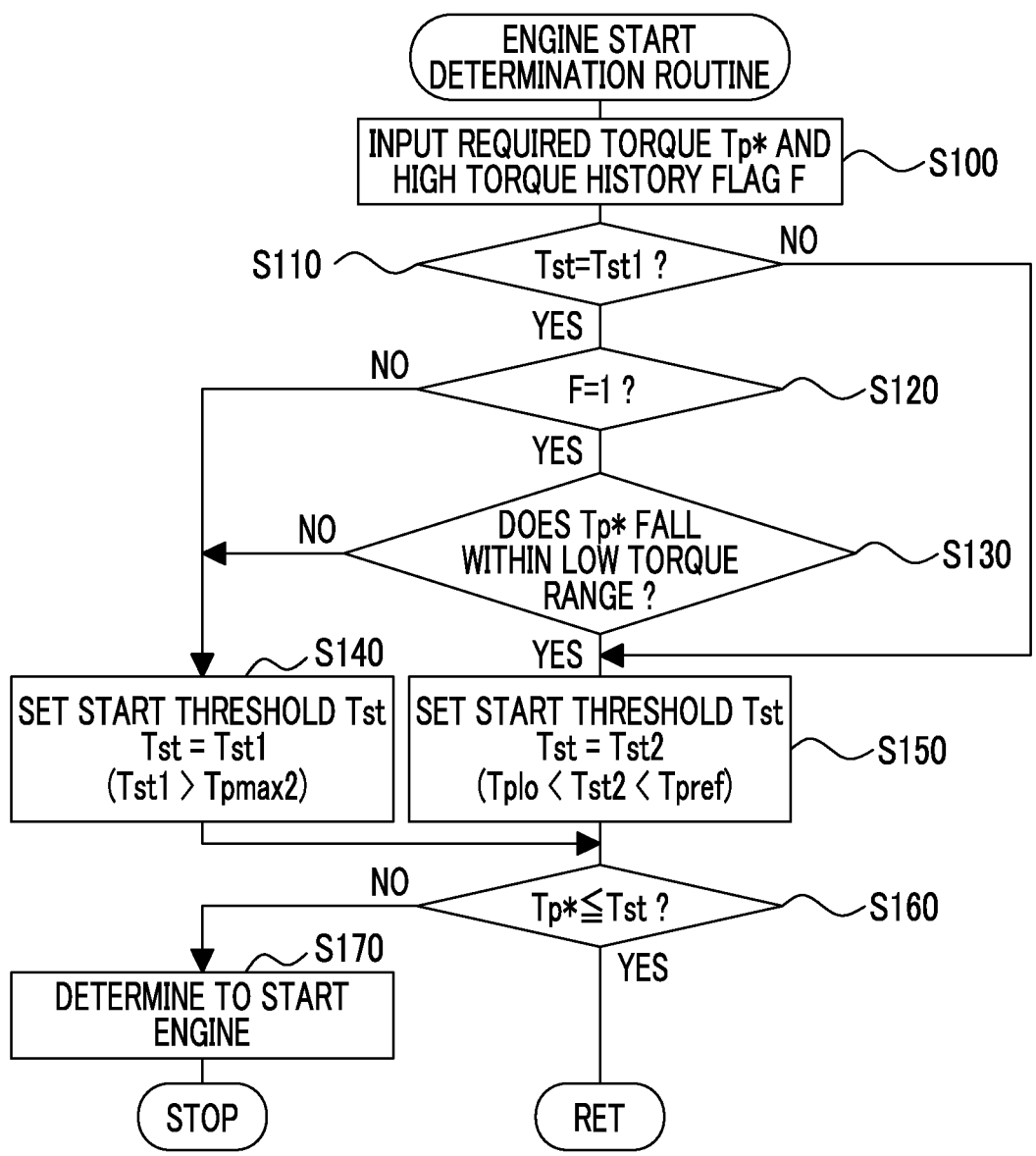
FIG. 4 is a flowchart that shows an example of an engine start determination routine that is executed by a hybrid electronic control unit according to the first embodiment.

Next, the operation of the thus configured hybrid vehicle 20 according to the first embodiment, particularly, the operation at the time of determining whether to start the engine 22 in the EV drive mode in the CD mode, will be described. FIG. 4 is a flowchart that shows an example of an engine start determination routine that is executed by the NV-ECU 70 according to the first embodiment. This routine is repeatedly executed in the EV drive mode (when determination as to whether to start the engine 22 is not being carried out).

As the engine start determination routine shown in FIG. 4 is executed, the HV-ECU 70 initially inputs data, such as the required torque Tp* and a high torque history flag F (step S100). The required torque Tp* to be input is a value set through the above-described control. The high torque history flag F is a flag that indicates whether there is a history that the required torque Tp* has reached a predetermined high torque range in the EV drive mode. The high torque history flag F to be input is a value set through a flag setting routine (not shown). In the flag setting routine, the high torque history flag F is set to 0 as an initial value at a startup of the system, and the high torque history flag F is changed from 0 to 1 at the time when the required torque Tp* has reached the high torque range in the EV drive mode. In the first embodiment, it is determined that the required torque Tp* has reached the high torque range at the time when the required torque Tp* becomes larger than a lower limit boundary value Tphi of the high torque range. In the first embodiment, this boundary value Tphi is a value smaller than the selection threshold Tpref for selecting the single-drive mode or the double-drive mode. The boundary value Tphi reduces as the rotation speed Np of the drive shaft 36 increases. The boundary value Tphi is an example of the first value according to the present disclosure.

As the data are input in this way, it is determined whether a start threshold Tst of the engine 22 is a value Tst1 as an initial value (a value just after a startup of the system) (step S110). The value Tst1 will be described later. When it is determined that the start threshold Tst is the value Tst1, the value of the high torque history flag F is checked (step S120).

When the high torque history flag F is 0 in step S120, it is determined that there is no history that the required torque Tp* has reached the high torque range in the EV drive mode, and the start threshold Tst of the engine 22 is set to the value Tst1 (step S140). In the first embodiment, the value Tst1 is a value slightly larger than the maximum double-drive torque Tpmax2. The value Tst1 reduces as the rotation speed Np of the drive shaft 36 increases. The value Tst1 is an example of the third value according to the present disclosure.

As the start threshold Tst is set in this way, the required torque Tp* is compared with the start threshold Tst (step S160). Since the operation in a state where there is no history that the required torque Tp* has reached the high torque range is being considered, the required torque Tp* is smaller than the start threshold Tst (=Tst1>Tpmax2>Tpref>Tphi). Therefore, it is determined to continue the EV drive mode, after which the routine is ended.

When the high torque history flag F is 1 in step S120, it is determined that there is a history that the required torque Tp* has reached the high torque range in the EV drive mode, and it is determined whether the required torque Tp* falls within a predetermined low torque range (step S130). In the first embodiment, when the required torque Tp* is smaller than or equal to the upper limit boundary value Tplo of the low torque range, it is determined that the required torque Tp* falls within the low torque range; when the required torque Tp* is larger than the boundary value Tplo, it is determined that the required torque Tp* falls outside the low torque range. In the first embodiment, this boundary value Tplo is a value smaller than the lower limit boundary value Tphi of the high torque range. The boundary value Tplo reduces as the rotation speed Np of the drive shaft 36 increases. The boundary value Tplo is an example of the second value according to the present disclosure.

When it is determined in step S130 that the required torque Tp* falls outside the low torque range, the start threshold Tst is set to the value Tst1 (step S140), and the required torque Tp* is compared with the start threshold Tst (step S160). When the required torque Tp* is smaller than or equal to the start threshold Tst, it is determined to continue the EV drive mode, after which the routine is ended. When the required torque Tp* becomes larger than the start threshold Tst, it is determined to start the engine 22 (step S170), after which the routine is ended.

Figure 5:
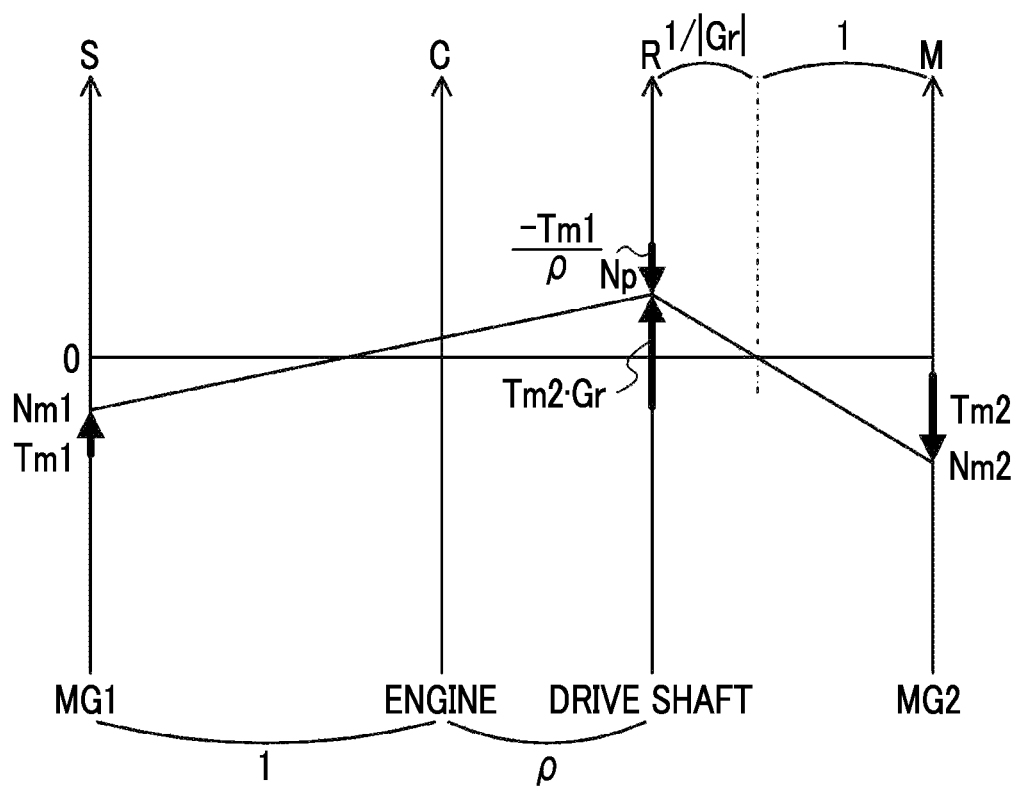
FIG. 5 is a view that illustrates an example of a nomograph of the planetary gear at the time when an engine is started in the first embodiment.

When it is determined to start the engine 22, the engine 22 is started through coordinated control of the HV-ECU 70, the engine ECU 24 and the motor ECU 40. FIG. 5 is a view that illustrates an example of a nomograph of the planetary gear 30 at the time when the engine 22 is started. As shown in FIG. 5, when the engine 22 is cranked, a positive torque Tm I for cranking the engine 22 is output from the motor MG1 and a torque obtained by dividing a positive torque (Tcr+Tp*), which is the sum of a cancellation torque Tcr for cancelling the torque (−Tm1/ρ) that is output from the motor MG1 to act on the drive shaft 36 and the required torque Tp*, by the reduction gear ratio Gr of the reduction gear 35 is output from the motor MG2 within the range of the input and output limits Win, Wout of the battery 50, the positive-side rated torque Tm1rt2 of the motor MG1 and the negative-side rated torque Tm2rt1 of the motor MG2. As the engine 22 is cranked and the rotation speed Ne of the engine 22 becomes higher than a predetermined rotation speed (for example, 800 rpm, 1000 rpm, or the like), operation control (fuel injection control, ignition control, and the like) over the engine 22 is started. As the start of the engine 22 completes, the drive mode shifts into the HV drive mode.

Since the operation in a state where the start threshold Tst is set to the value Tst1 (>Tpmax2) is being considered, when the required torque Tp* becomes larger than the start threshold Tst in the double-drive mode, the engine 22 is started, and the drive mode shifts into the HV drive mode.

When it is determined in step S130 that the required torque Tp* falls within the low torque range, the start threshold Tst is set to a value Tst2 (step S150), and the process from step S160 is executed. In the first embodiment, the value Tst2 is a value smaller than the selection threshold Tpref for selecting the single-drive mode or the double-drive mode and larger than the upper limit boundary value Tplo of the low torque range. This value Tst2, as well as the value Tst1, reduces as the rotation speed Np of the drive shaft 36 increases. The value Tst2 is an example of the fourth value according to the present disclosure.

Since the operation in a state where the required torque Tp* falls within the low torque range (smaller than or equal to the boundary value Tplo) is being considered, the required torque Tp* is smaller than the start threshold Tst. Therefore, it is determined to continue the EV drive mode, after which the routine is ended.

When the routine is executed next time or later, it is determined in step S110 that the start threshold Tst is not the value Tst1, the start threshold Tst is set to the value Tst2 (step S150), and the process from step S160 is executed. Since the operation in a state where the start threshold Tst is set to the value Tst2 (<Tpref) is being considered, when the required torque Tp* becomes larger than the start threshold Tst in the single-drive mode, the engine 22 is started, and the drive mode shifts into the HV drive mode. In the first embodiment, after that, when the system stops or the system starts up next time, the start threshold Tst is changed (returned) to the value Tst1 as an initial value.

The reason why the start threshold Tst is changed from the value Tst1 (>Tpmax2) to the value Tst2 T(<Tpref) when the high torque history flag F is 1 (when there is a history that the required torque Tp* has reached the high torque range in the EV drive mode) and the required torque Tp* falls within the low torque range will be described.

Figure 6:
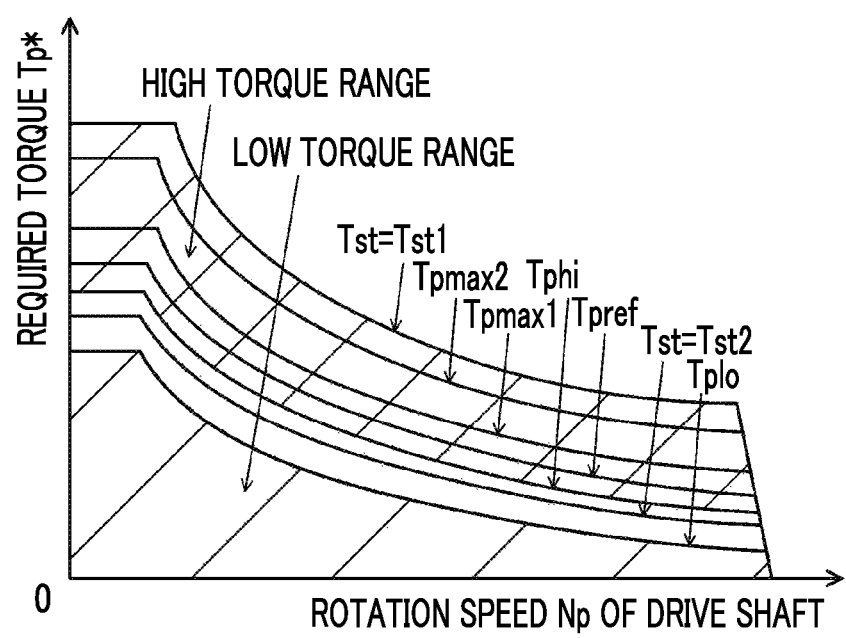
FIG. 6 is a view that illustrates an example of the relationship among a maximum single-drive torque, a maximum double-drive torque, a selection threshold for selecting the single-drive mode or the double-drive mode, a start threshold, a lower limit boundary value of a high torque range and an upper limit boundary value of a low torque range in the hybrid vehicle according to the first embodiment.

FIG. 6 is a view that illustrates an example of the relationship among the maximum single-drive torque Tpmax1, the maximum double-drive torque Tpmax2, the selection threshold Tpref for selecting the single-drive mode or the double-drive mode, the start threshold Tst (the value Tst1 or the value Tst2), the lower limit boundary value Tphi of the high torque range, and the upper limit boundary value Tplo of the low torque range. In FIG. 6, the high torque range and the low torque range are hatched. As shown in FIG. 6, in order from a larger side, there are the value Tst1, the maximum double-drive torque Tpmax2, the maximum single-drive torque Tpmax1, the selection threshold Tpref, the boundary value Tphi, the value Tst2, and the boundary value Tplo. Any one of the boundary value Tphi and the value Tst2 may be larger, or the boundary value Tphi and the value Tst2 may be the same value. As described above, the boundary value Tphi, the boundary value Tplo, the value Tst2, and the value Tst2 are respectively examples of the first value, second value, third value, and fourth value.

Since the operation in the EV drive mode in the CD mode is being considered, it is required to give a higher priority to the EV drive mode as compared to the CS mode. Therefore, by setting the torque Tst1 larger than the maximum double-drive torque Tpmax2 as the start threshold Tst, it is possible to start the engine 22, that is, to further reduce shifting of the drive mode from the EV drive mode to the HV drive mode.

However, when the value Tst1 is used as the start threshold Tst, the engine 22 is started in the double-drive mode. As is apparent from FIG. 3 and FIG. 5, at the time of starting the engine 22 in the double-drive mode, torque from the motor MG1 changes from negative to positive, so torque that is output from the motor MG1 to act on the drive shaft 36 changes from positive to negative, with the result that there is a possibility that the total positive torque that is output to the drive shaft 36 reduces by a large amount to some extent. At the time of starting the engine 22 because of the fact that the required torque Tp* increases and becomes larger than the start threshold Tst, it is presumable that the accelerator operation amount Acc is increasing (a driver is issuing an acceleration request). For this reason, if the above-described phenomenon occurs, the driver may experience a feeling of slowness. In the double-drive mode, torque from the motor MG2 is close to the value (Tpref/Gr) obtained by dividing the selection threshold Tpref for selecting the single-drive mode or the double-drive mode by the reduction gear ratio Gr of the reduction gear 35 or the negative-side rated torque Tm2rt1, so it may be not possible to cause the above-described cancellation torque Tcr to act from the motor MG2 on the drive shaft 36. In this case, a driver may be caused to further experience a feeling of slowness (for an extended period of time).

In the first embodiment, when there is a history that the required torque Tp* has reached the high torque range in the EV drive mode and the required torque Tp* falls within the low torque range, the start threshold Tst is changed from the value Tst1 (>Tpmax2) to the value Tst2 (<Tpref). When there is a history that the required torque Tp* has reached the high torque range in the EV drive mode, this is the case where the required torque Tp* has become relatively large before the present time (the driver has exhibited an intention to accelerate), so it is assumed that the required torque Tp* can become relatively large again after the present time (the driver can exhibit an intention to accelerate). By setting the start threshold Tst to the value Tst2, when the required torque Tp* becomes larger than the start threshold Tst, the engine 22 is started in the single-drive mode. As is apparent from FIG. 2 and FIG. 5, at the time of starting the engine 22 in the single-drive mode, torque from the motor MG1 changes from zero to a positive torque. Thus, in comparison with the case where torque from the motor MG1 changes from negative to positive, it is possible to reduce a reduction in the total positive torque that is output to the drive shaft 36 at the time of starting the engine 22. As a result, at the time of starting the engine 22, it is possible to reduce a feeling of slowness that is experienced by the driver. As a result of these, when it is assumed that the required torque Tp* becomes relatively large again after the present time, it is possible to take measures in advance in order not to cause the driver to experience a feeling of slowness at the time of starting the engine 22.

When the value Tst2 is set to a value smaller than the maximum single-drive torque Tpmax1 to such an extent that it is possible to cause the cancellation torque Tcr to act from the motor MG2 on the drive shaft 36, it is possible to further sufficiently reduce a reduction in the total positive torque that is output to the drive shaft 36, so it is possible to further reduce a feeling of slowness that is experienced by the driver.

The above-described hybrid vehicle 20 according to the first embodiment changes the start threshold Tst from the value Tst1 larger than the maximum double-drive torque Tpmax2 to the value Tst2 smaller than the selection threshold Tpref for selecting the single-drive mode or the double-drive mode when there is a history that the required torque Tp* has reached the high torque range and the required torque Tp* falls within the low torque range in the EV drive mode in the CD mode. Thus, when it is assumed that the required torque Tp* becomes relatively large again after the present time, it is possible to take measures in advance in order not to cause the driver to experience a feeling of slowness at the time of starting the engine 22.

In the hybrid vehicle 20 according to the first embodiment, the operation at the time of determining whether to start the engine 22 in the EV drive mode in the CD mode is described. After the engine 22 is started and the drive mode shifts into the HV drive mode, for example, when the required torque Tp* becomes smaller than or equal to the value Tst2, the engine 22 may be stopped, and the drive mode may shift into the EV drive mode.

In the hybrid vehicle 20 according to the first embodiment, the operation at the time of determining whether to start the engine 22 in the EV drive mode in the CD mode is described. In the EV drive mode in the CS mode, for example, the start threshold Tst may be set to the value Tst2 irrespective of the magnitude relation between an accelerator operation speed ΔAcc and a fast depression threshold ΔAref, and, when the required torque Tp* becomes larger than the start threshold Tst, the engine 22 may be started, and the drive mode may shift into the HV drive mode. In the CS mode, the state of charge SOC of the battery 50 is often lower than that in the CD mode. Therefore, by setting the start threshold Tst in this way, it is possible to reduce a decrease in the state of charge SOC of the battery 50.

In the hybrid vehicle 20 according to the first embodiment, the operation at the time of determining whether to start the engine 22 in the EV drive mode in the CD mode is described. When the CD mode or the CS mode is not selected (for example, when a hybrid vehicle does not include the charger 60), it may be constantly determined whether to start the engine 22 in the EV drive mode as in the case of the first embodiment.

Figure 7:
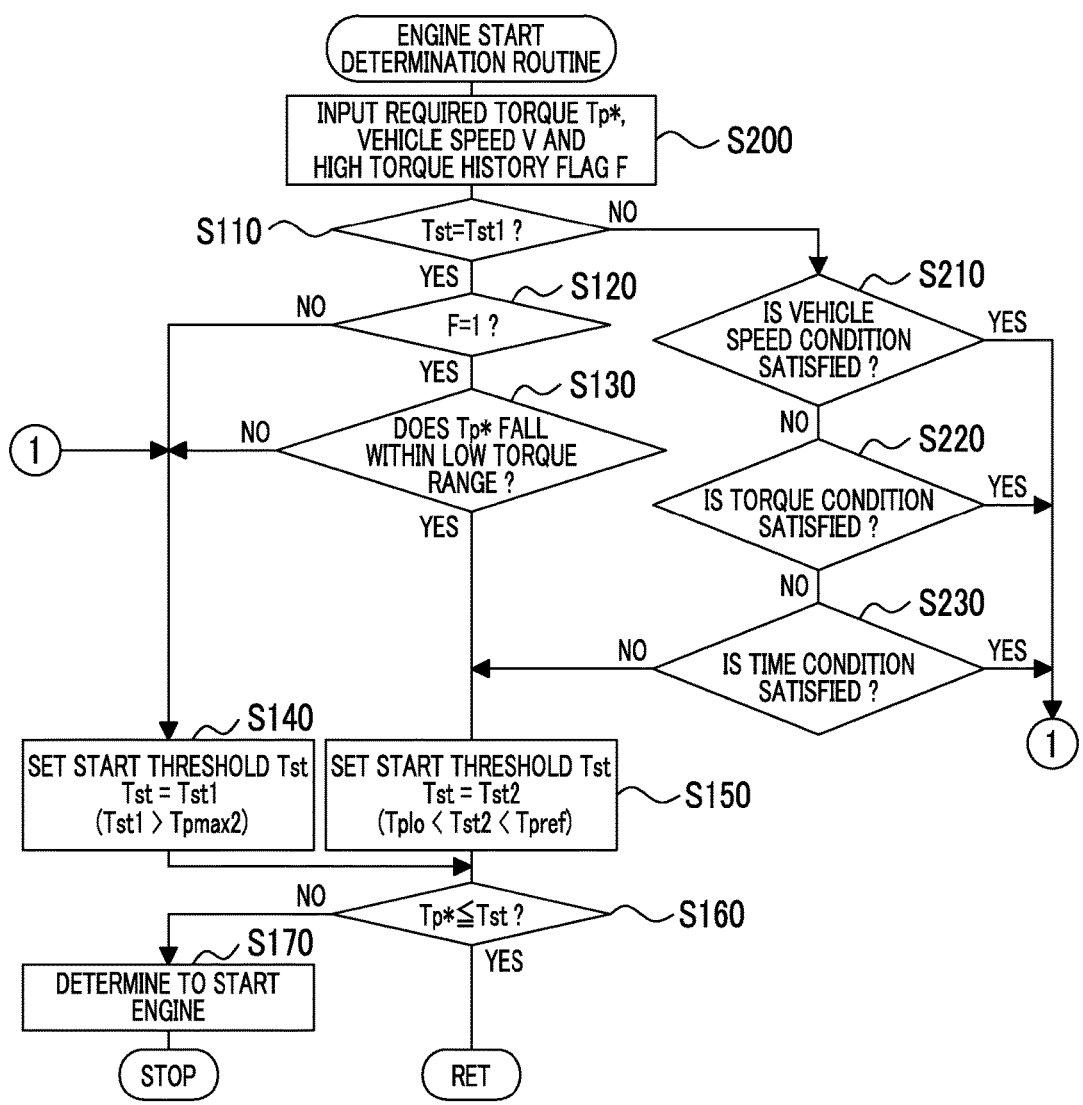
FIG. 7 is a flowchart that shows an engine start determination routine of a first alternative embodiment, which is executed by the hybrid electronic control unit according to the first embodiment.

The hybrid vehicle 20 according to the first embodiment is configured to execute the engine start determination routine shown in FIG. 4. Instead, the hybrid vehicle 20 may be configured to execute an engine start determination routine according to a first alternative embodiment shown in FIG. 7, described below. The engine start determination routine shown in FIG. 7 is the same as the engine start determination routine shown in FIG. 4 except that the process of step S200 is executed instead of the process of step S100 and the processes of step S210 to step S230 are added. Therefore, like step numbers denote the same processes, and the detailed description thereof is omitted.

In the engine start determination routine shown in FIG. 7, as well as the process of step S100 of the engine start determination routine shown in FIG. 4, the HV-ECU 70 inputs the required torque Tp* and the high torque history flag F, and inputs the vehicle speed V (step S200). The vehicle speed V to be input is a value detected by the vehicle speed sensor 88.

Subsequently, it is determined whether the start threshold Tst of the engine 22 is the value Tst1 (step S110). When it is determined that the start threshold Tst is not the value Tst1, that is, the start threshold Tst is the value Tst2, it is determined whether a condition for resetting the start threshold Tst (a condition for changing the start threshold Tst from the value Tst2 to the value Tst1) is satisfied (step S210 to step S230). When it is determined that the reset condition is not satisfied, the start threshold Tst is set to the value Tst2 (step S150), and the process from step S160 is executed. When it is determined that the reset condition is satisfied, the start threshold Tst is set to the value Tst1, that is, the start threshold Tst is changed from the value Tst2 to the value Tst1 (step S140), and the process from step S160 is executed.

A vehicle speed condition, a torque condition and a time condition are used as the reset condition. The vehicle speed condition is a condition that, after the start threshold Tst is changed to the value Tst2, the vehicle speed V has decreased across the threshold Vref1. The threshold Vref1 may be, for example, 40 km/h, 50 km/h, 60 km/h, or the like. The torque condition may be a condition that, after the start threshold Tst is changed to the value Tst2, a state where the required torque Tp* falls within the low torque range has continued over a predetermined time t11. The predetermined time t11 may be, for example, two seconds, three seconds, five seconds, or the like. The time condition is a condition that a predetermined time t12 has elapsed from when the start threshold Tst is changed to the value Tst2. The predetermined time t12 may be, for example, about several minutes to several hours.

In this alternative embodiment, when all the vehicle speed condition, the torque condition and the time condition are not satisfied, it is determined that the reset condition is not satisfied; whereas, when at least one of the vehicle speed condition, the torque condition or the time condition is satisfied, it is determined that the reset condition is satisfied.

In this way, by changing the start threshold Tst from the value Tst2 to the value Tst1 at the time when the reset condition is satisfied, it is possible to further reduce the start of the engine 22, for example, at the time when it is not assumed that the required torque Tp* becomes larger than the value Tst1 in a certain time from the present time as compared to when the start threshold Tst is kept at the value Tst2.

In this alternative embodiment, the vehicle speed condition, the torque condition and the time condition are used as the reset condition. Instead, only part of the vehicle speed condition, the torque condition and the time condition may be used.

Figure 8:
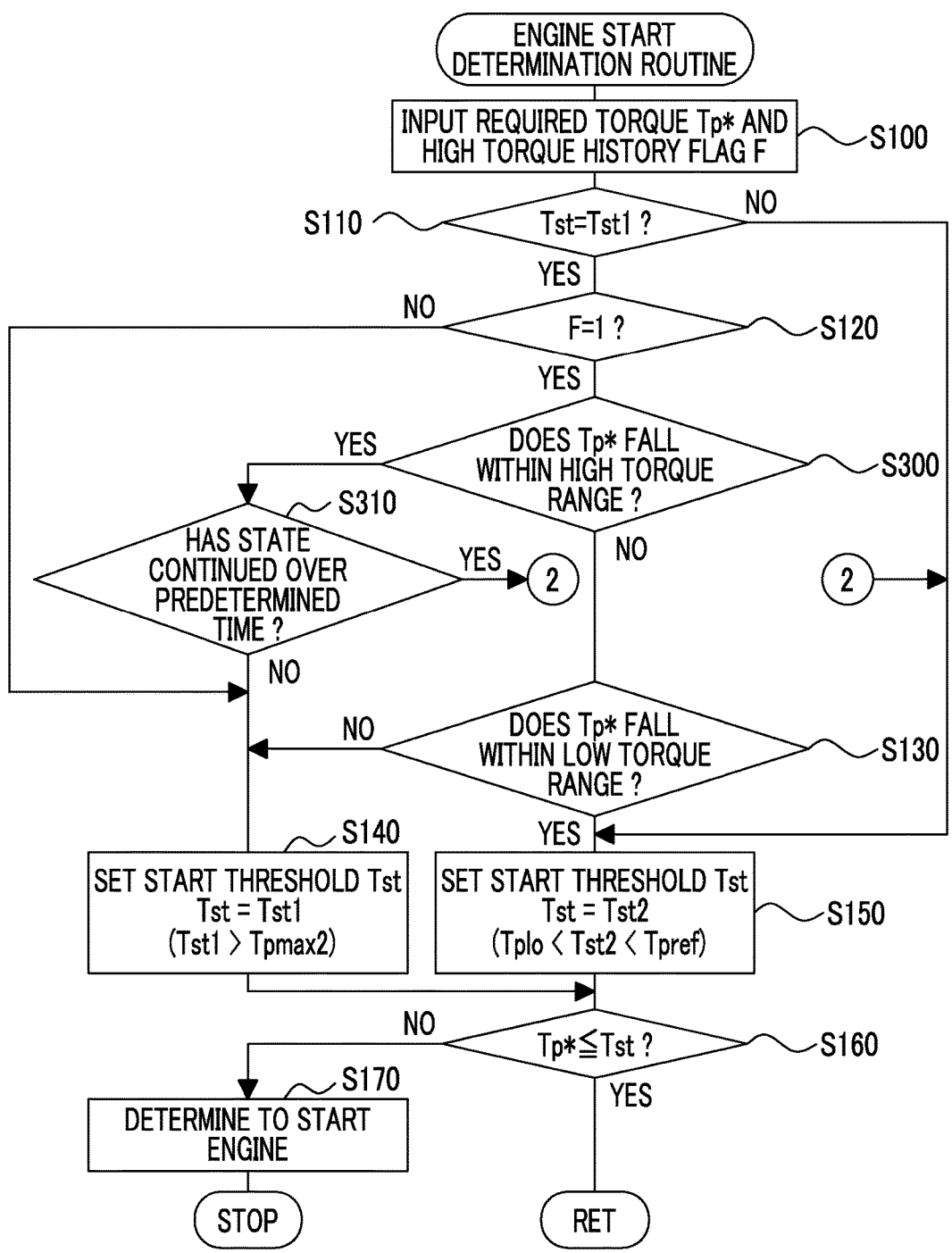
FIG. 8 is a flowchart that shows an engine start determination routine of a second alternative embodiment, which is executed by the hybrid electronic control unit according to the first embodiment.

The hybrid vehicle 20 according to the first embodiment is configured to execute the engine start determination routine shown in FIG. 4. Instead, the hybrid vehicle 20 may be configured to execute an engine start determination routine according to a second alternative embodiment shown in FIG. 8, described below. The engine start determination routine shown in FIG. 8 is the same as the engine start determination routine shown in FIG. 4 except that the processes of step S300 and step S310 are added. Therefore, like step numbers denote the same processes, and the detailed description thereof is omitted. In this alternative embodiment, after the engine 22 is started and the drive mode shifts into the HV drive mode, when the required torque Tp* becomes smaller than or equal to a value Tst3 smaller than the value Tst2, the engine 22 is stopped, and the drive mode shifts into the EV drive mode. The value Tst3, as well as the value Tst2, reduces as the rotation speed Np of the drive shaft 36 increases. The value Tst3 is an example of the fifth value according to the present disclosure.

In the engine start determination routine shown in FIG. 8, when the high torque history flag F is 1 (when there is a history that the required torque Tp* has reached the high torque range) in step S120, the HV-ECU 70 determines whether the required torque Tp* falls within the high torque range (step S300). When it is determined that the required torque Tp* falls outside the high torque range, the HV-ECU 70 executes the process from step S130.

When it is determined in step S300 that the required torque Tp* falls within the high torque range, it is determined whether the state has continued over a predetermined time t13 (step S310). When it is determined that the state has not continued over the predetermined time t13, the start threshold Tst is set to the value Tst1 (step S140), and the process from step S160 is executed.

When it is determined in step S310 that the state where the required torque Tp* falls within the high torque range has continued over the predetermined time t13, the start threshold Tst is set to the value Tst2, that is, the start threshold Tst is changed from the value Tst1 to the value Tst2 (step S150), and the process from step S160 is executed. As described above, both the lower limit boundary value Tphi of the high torque range and the value Tst2 are smaller than the selection threshold Tpref for selecting the single-drive mode or the double-drive mode. When the state where the required torque Tp* falls within the high torque range has continued over the predetermined time t13, the current required torque Tp* is larger than the boundary value Tphi. Therefore, as a result of changing the start threshold Tst to the value Tst2, there can be the case where the engine is started in the single-drive mode and the case where the engine is started in the double-drive mode. However, in this alternative embodiment, when the required torque becomes smaller than or equal to the value Tst3 (≤Tst2) in the HV drive mode, the engine is stopped, and the drive mode shifts into the EV drive mode. Therefore, after the EV drive mode is resumed, it is possible to start the engine in the single-drive mode.

In the hybrid vehicle 20 according to the first embodiment, the selection threshold Tpref for selecting the single-drive mode or the double-drive mode is set to a value smaller than the maximum single-drive torque Tpmax1. Instead, the selection threshold Tpref may be the same value as the maximum single-drive torque Tpmax1.

In the hybrid vehicle 20 according to the first embodiment, the lower limit boundary value Tphi of the high torque range is a value smaller than the selection threshold Tpref for selecting the single-drive mode or the double-drive mode. Instead, the boundary value Tphi may be the same value as the selection threshold Tpref.

In the hybrid vehicle 20 according to the first embodiment, the upper limit boundary value Tplo of the low torque range is a value smaller than the lower limit boundary value Tphi of the high torque range. Instead, the boundary value Tplo may be the same value as the boundary value Tphi. In this case, for the required torque Tp*, a range smaller than or equal to the boundary value Tplo is set as the low torque range, and a range larger than the boundary value Tphi (=Tplo) is set as the high torque range.

In the hybrid vehicle 20 according to the first embodiment, the value Tst1 that is used to set the start threshold Tst is a value larger than the maximum double-drive torque Tpmax2. Instead, the value Tst1 may be the same value as the maximum double-drive torque Tpmax2, or may be a value smaller than the maximum double-drive torque Tpmax2 and larger than the selection threshold Tpref.

In the hybrid vehicle 20 according to the first embodiment, the value Tst2 that is used to set the start threshold Tst is a value smaller than the selection threshold Tpref for selecting the single-drive mode or the double-drive mode and larger than the upper limit boundary value Tplo of the low torque range. Instead, the value Tst2 may be the same value as the selection threshold Tpref or may be the same value as the boundary value Tplo. When the selection threshold Tpref and the boundary value Tplo are the same value, the value Tst2 is the same value as these values.

Figure 9:
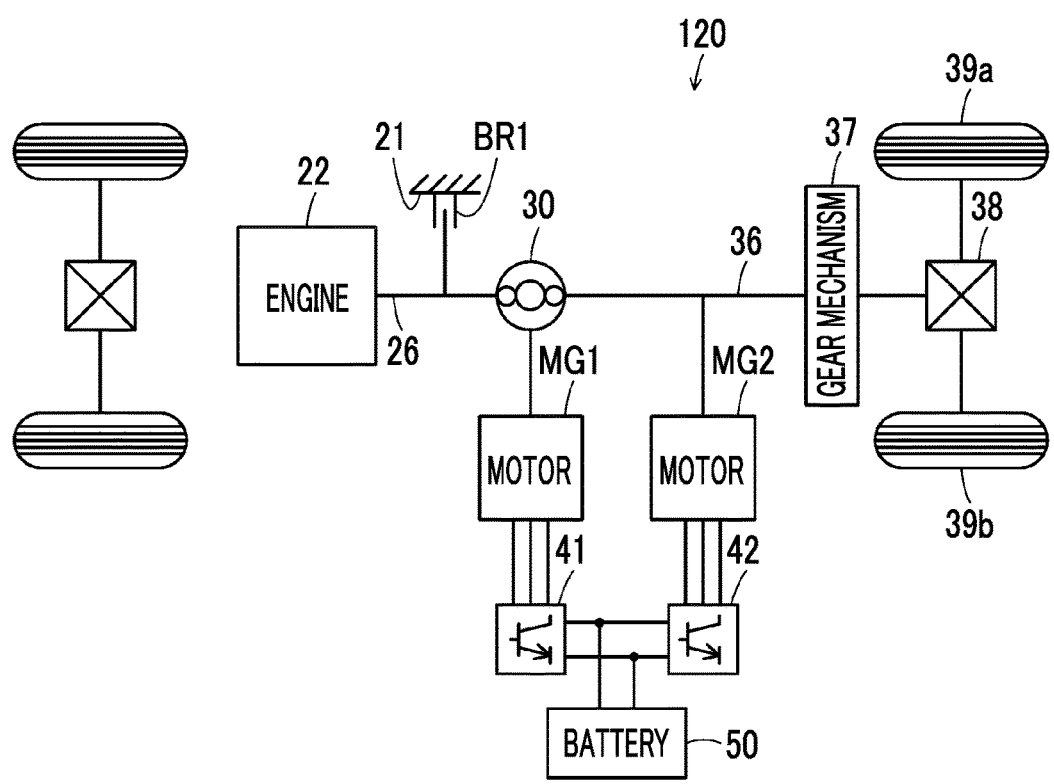
FIG. 9 is a configuration view that schematically shows the configuration of a hybrid vehicle according to a second embodiment of the present disclosure.

In the hybrid vehicle 20 according to the first embodiment, the one-way clutch CL1 is connected to the crankshaft 26 of the engine 22 (the carrier 34 of the planetary gear 30). Instead, a hybrid vehicle according to a second embodiment, which will be described below, is also applicable. FIG. 9 shows the hybrid vehicle 120 according to the second embodiment. A brake BR1 may be provided. The brake BR1 fixes (connects) the crankshaft 26 of the engine 22 to the case 21 such that the crankshaft 26 is non-rotatable, or releases the crankshaft 26 of the engine 22 from the case 21 such that the crankshaft 26 is rotatable. In this case, in the EV drive mode, the engine 22 is set to a rotation stopped state by setting the brake BR1 to an engaged state. In the HV drive mode, the engine 22 is set to a rotating state by setting the brake BR1 to a released state.

In the hybrid vehicle 20 according to the first embodiment, the motor MG2 is connected to the drive shaft 36 via the reduction gear 35. Instead, the motor MG2 may be directly coupled to the drive shaft 36. Alternatively, the motor MG2 may be connected to the drive shaft 36 via a transmission.

The hybrid vehicle 20 according to the first embodiment includes the single planetary gear 30 as the planetary gear set. Instead, a plurality of planetary gears may be provided as the planetary gear set. In this case, the configuration shown as a hybrid vehicle 220 according to a third embodiment shown in FIG. 10, which will be described below, may be employed.

Figure 10:
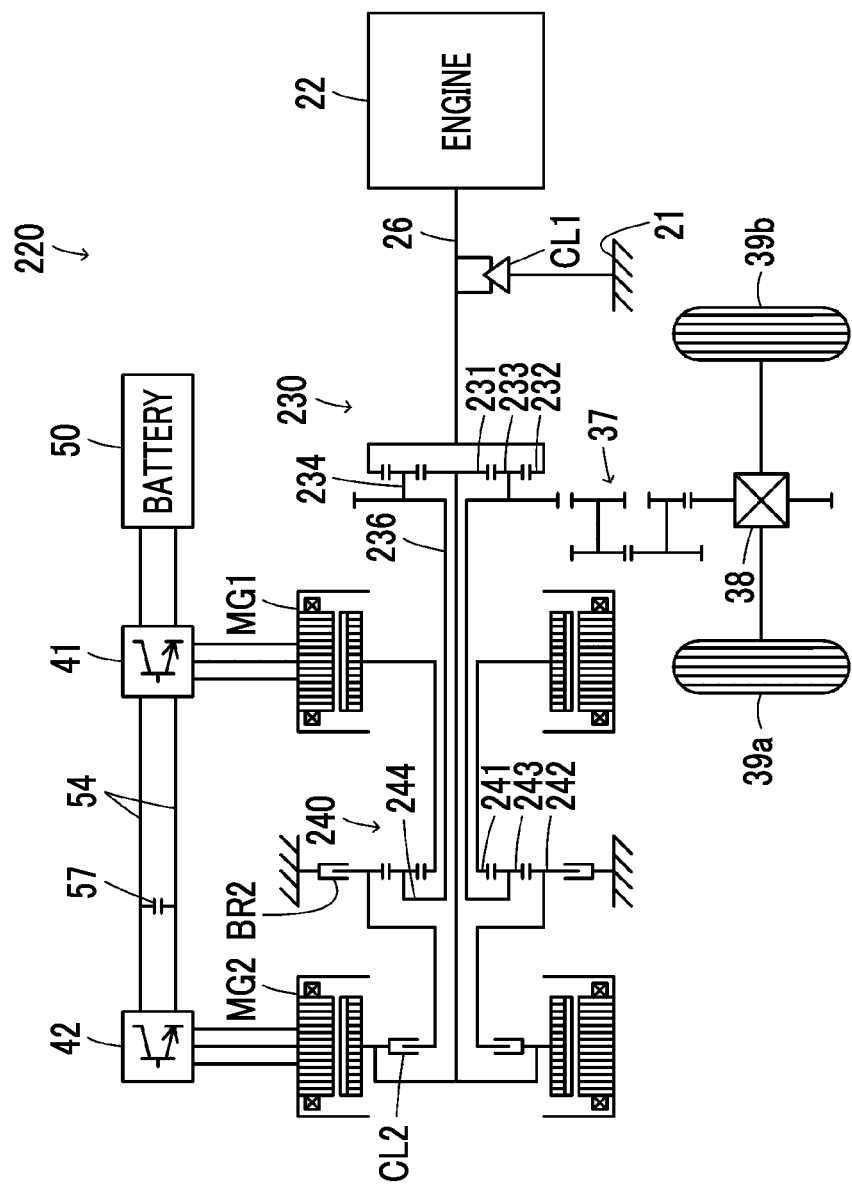
FIG. 10 is a configuration view that schematically shows the configuration of a hybrid vehicle according to a third embodiment of the present disclosure.

The hybrid vehicle 220 according to the third embodiment shown in FIG. 10 includes planetary gears 230, 240 instead of the planetary gear 30 of the hybrid vehicle 20 as the planetary gear set, and also includes a clutch CL2 and a brake BR2.

The planetary gear 230 is a single pinion planetary gear. The planetary gear 230 includes a sun gear 231, a ring gear 232, a plurality of pinions 233 and a carrier 234. The sun gear 231 is an external gear. The ring gear 232 is an internal gear. The plurality of pinions 233 are in mesh with the sun gear 231 and the ring gear 232. The carrier 234 supports the plurality of pinions 233 such that each pinion 233 is rotatable and revolvable. The rotor of the motor MG2 is connected to the sun gear 231. The crankshaft 26 of the engine 22 is connected to the ring gear 232. A drive shaft 236 coupled to the drive wheels 39a, 39b via the differential gear 38 and the gear mechanism 37 is connected to the carrier 234.

The planetary gear 240 is a single pinion planetary gear. The planetary gear 240 includes a sun gear 241, a ring gear 242, a plurality of pinions 243 and a carrier 244. The sun gear 241 is an external gear. The ring gear 242 is an internal gear. The plurality of pinions 243 are in mesh with the sun gear 241 and the ring gear 242. The carrier 244 supports the plurality of pinions 243 such that each pinion 243 is rotatable and revolvable. The rotor of the motor MG1 is connected to the sun gear 241. The drive shaft 236 is connected to the carrier 244.

The clutch CL2 connects the sun gear 231 of the planetary gear 230 and the rotor of the motor MG2 to the ring gear 242 of the planetary gear 240 or releases the connection therebetween. The brake BR2 fixes (connects) the ring gear 242 of the planetary gear 240 to the case 21 such that the ring gear 242 is non-rotatable, or releases the ring gear 242 from the case 21 such that the ring gear 242 is rotatable.

Figure 11:
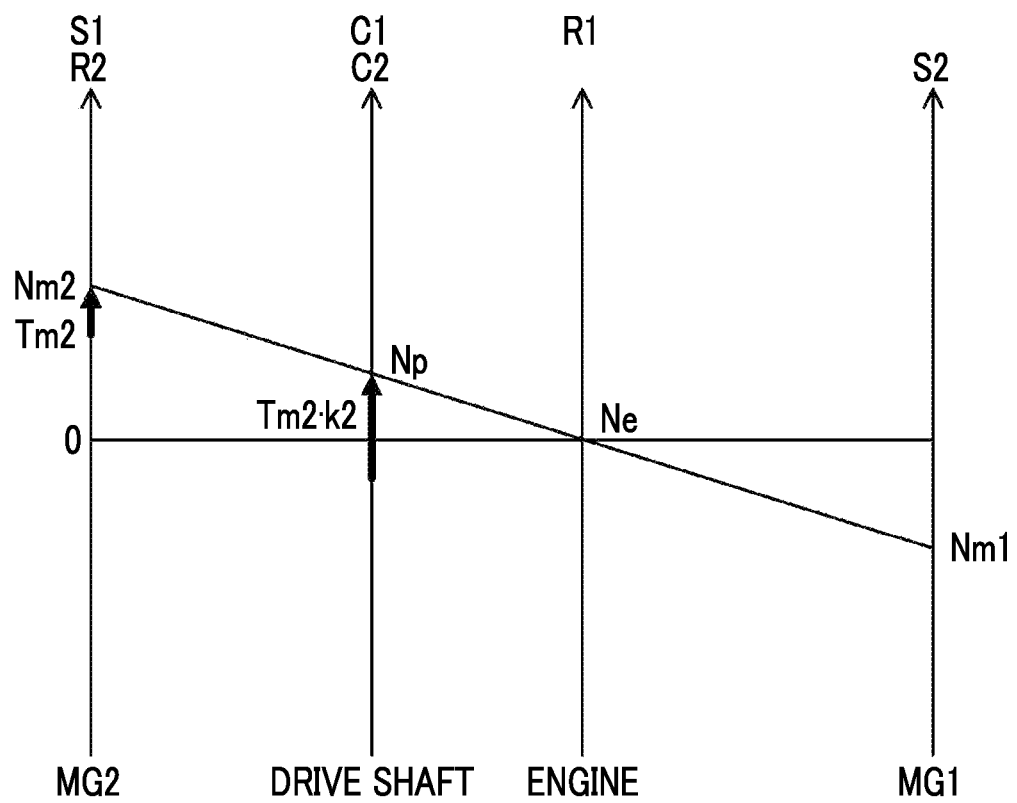
FIG. 11 is a view that illustrates an example of a nomograph of two planetary gears in single-drive mode in a state where a clutch is set to an engaged state and a brake is set to a released state in the third embodiment.
Figure 12:
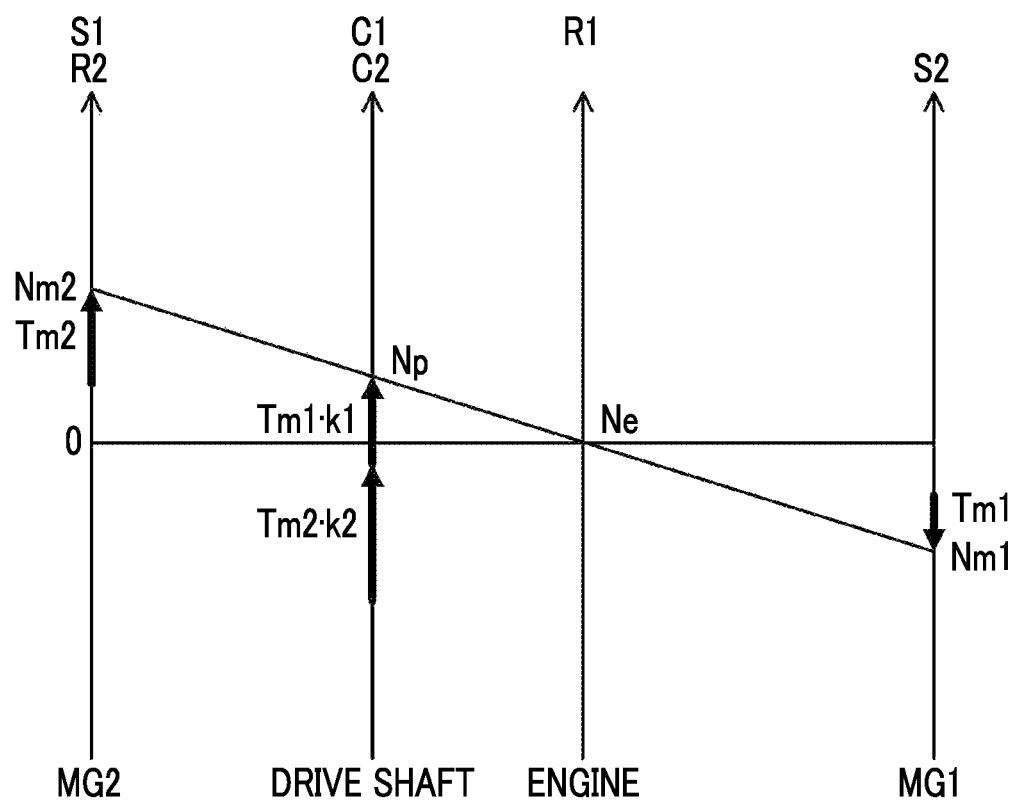
FIG. 12 is a view that illustrates an example of a nomograph of the two planetary gears in double-drive mode in a state where the clutch is set to the engaged state and the brake is set to the released state in the third embodiment.
Figure 13:
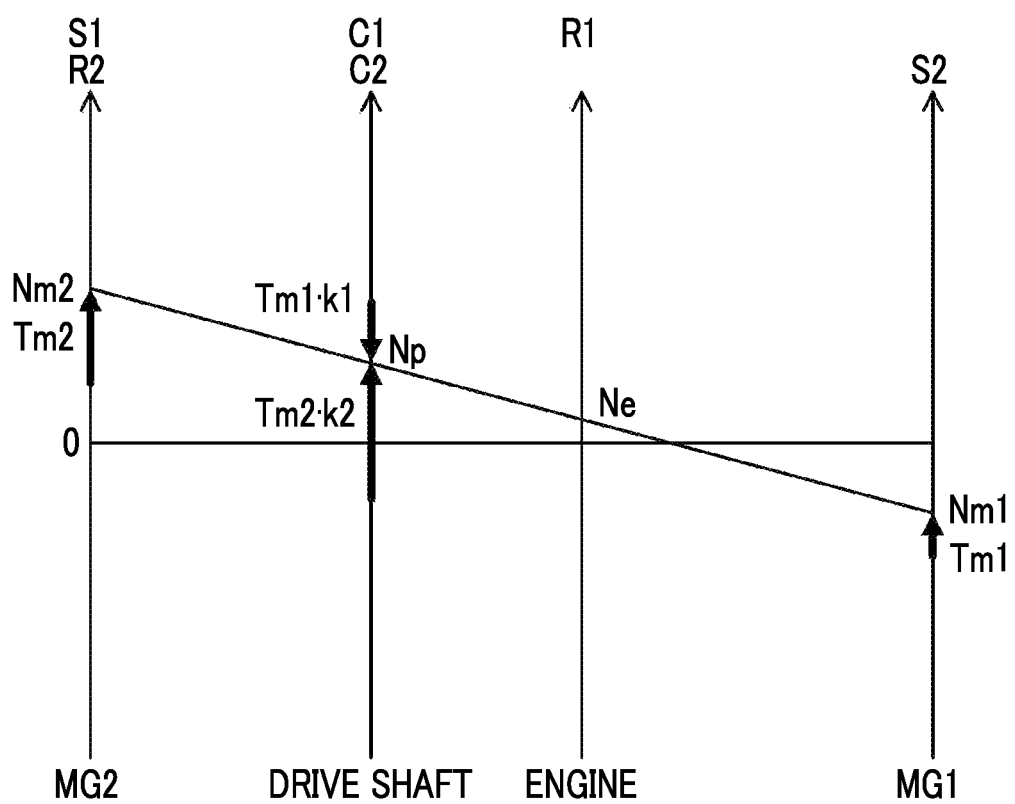
FIG. 13 is a view that illustrates an example of a nomograph of the two planetary gears at the time when an engine is started in a state where the clutch is set to the engaged state and the brake is set to the released state in the third embodiment.

FIG. 11 is a view that illustrates an example of a nomograph of the planetary gears 230, 240 in the single-drive mode while the clutch CL2 is set to an engaged state and the brake BR2 is set to a released state in the hybrid vehicle according to the third embodiment. FIG. 12 is a view that illustrates an example of a nomograph of the planetary gears 230, 240 in the double-drive mode while the clutch CL2 is set to the engaged state and the brake BR2 is set to the released state in the hybrid vehicle according to the third embodiment. FIG. 13 is a view that illustrates an example of a nomograph of the planetary gears 230, 240 at the time when the engine 22 is started while the clutch CL2 is set to the engaged state and the brake BR2 is set to the released state in the hybrid vehicle according to the third embodiment.

In FIG. 11 to FIG. 13, the S1 and R2-axis represents the rotation speed of the sun gear 231 of the planetary gear 230 or the rotation speed Nm2 of the motor MG2, and also represents the rotation speed of the ring gear 242 of the planetary gear 240, the C1 and C2-axis represents the rotation speed of the carrier 234 of the planetary gear 230 or the rotation speed of the carrier 244 of the planetary gear 240, and also represents the rotation speed Np of the drive shaft 236, the R1-axis represents the rotation speed of the ring gear 232 of the planetary gear 230, and also represents the rotation speed Ne of the engine 22, and the S2-axis represents the rotation speed of the sun gear 241 of the planetary gear 240, and also represents the rotation speed Nm1 of the motor MG1.

In FIG. 11, the wide-line arrow on the S1 and R2-axis indicates a torque Tm2 that is output from the motor MG2, and the wide-line arrow on the C1 and C2-axis indicates a torque (Tm2×k2) that is output from the motor MG2 to act on the drive shaft 236. A conversion coefficient k2 is a coefficient for converting the torque Tm2 of the motor MG2 to the torque of the drive shaft 236. In FIG. 12 and FIG. 13, the wide-line arrow on the S2-axis indicates a torque Tm1 that is output from the motor MG1, the wide-line arrow on the S1 and R2-axis indicates a torque Tm2 that is output from the motor MG2, and the two wide-line arrows on the C1 and C2-axis indicate a torque (Tm1×k1+Tm2×k2) that is output from the motors MG1, MG2 to act on the drive shaft 236. A conversion coefficient k1 is a coefficient for converting the torque Tm1 of the motor MG1 to the torque of the drive shaft 236.

In the case of FIG. 11 to FIG. 13, the clutch CL2 is set to the engaged state, so the rotation speed of the sun gear 231 of the planetary gear 230 and the rotation speed Nm2 of the motor MG2 are the same as the rotation speed of the ring gear 242 of the planetary gear 240. Therefore, the planetary gears 230, 240 function as a so-called four element planetary gear set.

In the single-drive mode, as shown in FIG. 11, the hybrid vehicle 220 is able to travel by outputting the positive torque Tm2 from the motor MG2 to cause the positive torque (Tm2×k2) to act on the drive shaft 236. The maximum single-drive torque Tpmax1 is equal to a value (Tm2rt2×k2) obtained by multiplying the positive-side rated torque Tm2rt2 of the motor MG2 by the conversion coefficient k2. This is easily derived from the nomograph of FIG. 11.

In the double-drive mode, as shown in FIG. 12, the hybrid vehicle 220 is able to travel by outputting the negative torque Tm1 from the motor MG1 and outputting the positive torque Tm2 from the motor MG2 to cause the positive torque (Tm1×k1+Tm2×k2) to act on the drive shaft 236. The maximum double-drive torque Tpmax2 is equal to the sum (Tm1rt1×k1+Tm2rt2×k2) of a value obtained by multiplying the negative-side rated torque Tm1rt1 of the motor MG1 by the conversion coefficient k1 and a value obtained by multiplying the positive-side rated torque Tm2rt2 of the motor MG2 by the conversion coefficient k2. This is easily derived from the nomograph of FIG. 12.

At the time of starting the engine 22, as shown in FIG. 13, the engine 22 is cranked by outputting the positive torque Tm1 from the motor MG1. As is apparent from FIG. 12 and FIG. 13, at the time of starting the engine 22 in the double-drive mode, the torque of the motor MG1 changes from the negative torque to the positive torque, and the torque that is output from the motor MG1 to act on the drive shaft 236 changes from positive to negative. For this reason, there is a possibility that the total positive torque that is output to the drive shaft 236 reduces by a large amount to some extent. In contrast, as in the case of the first embodiment, when the engine start determination routine shown in FIG. 4 is executed, there is a history that the required torque Tp* has reached the high torque range in the EV drive mode and the required torque Tp* falls within the low torque range, the start threshold Tst is changed from the value Tst1 larger than the maximum double-drive torque Tpmax2 to the value Tst2 smaller than the selection threshold Tpref for selecting the single-drive mode or the double-drive mode. Thus, similar advantageous effects to those of the first embodiment are obtained.

The correspondence relationship between the major elements of the embodiments and the major elements described in the summary will be described. In the first embodiment, the engine 22 is an example of the engine. The motor MG1 is an example of the first motor. The planetary gear 30 is an example of the planetary gear set. The motor MG2 is an example of the second motor. The one-way clutch CL1 is an example of the rotation restriction mechanism. The battery 50 is an example of the battery. The HV-ECU 70, the engine ECU 24 and the motor ECU 40 correspond to an example of the electronic control unit. In addition, the HV-ECU 70 that executes the engine start determination routine shown in FIG. 4 is also an example of the electronic control unit.

The correspondence relationship between the major elements of the first embodiment and the major elements described in the summary is not intended to limit the elements described in the summary since the first embodiment is an example for specifically illustrating a mode for carrying out the present disclosure, described in the summary. That is, the present disclosure described in the summary should be interpreted on the basis of the description in the summary, and the first embodiment is merely a specific example described in the summary.

The embodiments of the present disclosure are described above; however, the present disclosure is not limited to those embodiments. Of course, the present disclosure may be implemented in various forms without departing from the scope of the present disclosure.

The present disclosure is applicable to manufacturing industries of hybrid vehicles, or the like.

What is claimed is:
1. A hybrid vehicle comprising:
   an engine;
   a first motor;
   a planetary gear set including at least one planetary gear, at least part of rotating elements of the at least one planetary gear being connected to the engine, the first motor and a drive shaft such that the first motor, the engine and the drive shaft are arranged in this order in a nomograph, the drive shaft being coupled to an axle;

a second motor mechanically coupled to the drive shaft;

a rotation restriction mechanism configured to restrict rotation of the engine;

a battery configured to exchange electric power with the first motor and the second motor; and an electronic control unit configured to:

(i) control the engine, the first motor and the second motor in any one of a plurality of drive modes including a hybrid drive mode and an electric drive mode, so as to travel the hybrid vehicle by using a required torque that is required for the drive shaft in response to an accelerator operation amount, the hybrid drive mode being a mode in which the hybrid vehicle travels while the engine is placed in a rotating state to cause the engine to operate, and the electric drive mode being a mode in which the hybrid vehicle travels by using torque from at least the second motor while the engine is placed in a rotation stopped state to cause the engine not to operate, (ii) select a single-drive mode in the electric drive mode when the required torque is smaller than or equal to a selection threshold smaller than or equal to a first maximum torque that is outputtable to the drive shaft in the single-drive mode, and select a double-drive mode in the electric drive mode when the required torque is larger than the selection threshold, the single-drive mode being a mode in which the hybrid vehicle travels by using torque from only the second motor, and the double-drive mode being a mode in which the hybrid vehicle travels by using torque from the first motor and the second motor, (iii) control the hybrid vehicle so as to crank the engine to be started by using torque from the first motor when the required torque becomes larger than a start threshold in the electric drive mode, and (iv) change the start threshold from a third value larger than the selection threshold to a fourth value smaller than or equal to the selection threshold and larger than or equal to a second value, in the electric drive mode when a first predetermined condition that there is a history that the required torque has become larger than a first value smaller than or equal to the selection threshold and the required torque at a present time is smaller than or equal to the second value smaller than or equal to the first value is satisfied.

2. The hybrid vehicle according to claim 1, wherein the third value is a value larger than a second maximum torque that is outputtable to the drive shaft in the double-drive mode.

3. The hybrid vehicle according to claim 1, wherein the electronic control unit is configured to change the start threshold to the third value, when at least one of a vehicle speed condition, a torque condition or a time condition is satisfied, the vehicle speed condition being a condition that, after the start threshold is changed to the fourth value, a vehicle speed decreases across a predetermined vehicle speed in the electric drive mode, the torque condition being a condition that a state where the required torque is smaller than or equal to the second value continues for a first predetermined time, and the time condition being a condition that a second predetermined time elapses from when the start threshold is changed to the fourth value.

4. The hybrid vehicle according to claim 1, wherein the electronic control unit is configured to:

(i) execute control such that the engine is stopped when the required torque becomes smaller than or equal to a fifth value smaller than or equal to the fourth value in the hybrid drive mode, and (ii) change the start threshold from the third value to the fourth value even when the first predetermined condition is not satisfied when a second predetermined condition that a state where the required torque is larger than the first value continues over a third predetermined time is satisfied.

* * * * *

UNITED STATES PATENT AND TRADEMARK OFFICE
CERTIFICATE OF CORRECTION

PATENT NO. : 10,086,821 B2
APPLICATION NO. : 15/362081
DATED : October 2, 2018
INVENTOR(S) : Koji Hokoi, Koji Yamamoto and Koji Yoshihara It is certified that error appears in the above-identified patent and that said Letters Patent is hereby corrected as shown below:

In the Specification

In Column 7, Line 18, delete "$f$m2" and insert --$\theta$m2--, therefor.

In Column 11, Line 26, delete "NV-ECU" and insert --HV-ECU--, therefor.

In Column 11, Line 40, delete "NV-ECU" and insert --HV-ECU--, therefor.

In Column 13, Line 66, before "and the value Tst2", delete "Tst2," and insert --Tst1,--, therefor.

Signed and Sealed this
Twentieth Day of November, 2018

Andrei Iancu
*Director of the United States Patent and Trademark Office*